US008780972B2

(12) United States Patent
He et al.

(10) Patent No.: US 8,780,972 B2
(45) Date of Patent: Jul. 15, 2014

(54) METHODS AND DEVICES FOR DATA COMPRESSION USING OFFSET-BASED ADAPTIVE RECONSTRUCTION LEVELS

(75) Inventors: Dake He, Waterloo (CA); Xiang Yu, Waterloo (CA); Jing Wang, Waterloo (CA); En-hui Yang, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 353 days.

(21) Appl. No.: 13/155,616

(22) Filed: Jun. 8, 2011

(65) Prior Publication Data

US 2012/0219055 A1 Aug. 30, 2012

Related U.S. Application Data

(60) Provisional application No. 61/446,528, filed on Feb. 25, 2011.

(51) Int. Cl.
H04N 7/12 (2006.01)
H04N 11/02 (2006.01)
H04N 11/04 (2006.01)
H04N 7/26 (2006.01)
H04N 7/50 (2006.01)

(52) U.S. Cl.
CPC ... *H04N 19/00369* (2013.01); *H04N 19/00284* (2013.01); *H04N 19/00175* (2013.01); *H04N 19/00551* (2013.01); *H04N 19/00272* (2013.01); *H04N 19/00781* (2013.01); *H04N 19/0009* (2013.01); *H04N 19/00363* (2013.01); *H04N 19/00278* (2013.01); *H04N 19/00266* (2013.01); *H04N 19/00884* (2013.01); *H04N 19/00357* (2013.01)
USPC .......................................................... 375/240

(58) Field of Classification Search
None
See application file for complete search history.

(56) References Cited

U.S. PATENT DOCUMENTS

| 7,106,795 B2* | 9/2006 | Kerofsky ................. 375/240.03 |
| 7,792,193 B2 | 9/2010 | Tanizawa et al. |
| 2006/0013497 A1 | 1/2006 | Yang et al. |
| 2007/0147497 A1 | 6/2007 | Bao et al. |
| 2007/0217506 A1 | 9/2007 | Yang et al. |
| 2011/0007802 A1* | 1/2011 | Karczewicz et al. .... 375/240.15 |

FOREIGN PATENT DOCUMENTS

| EP | 0550012 A2 | 7/1993 |
| JP | 2007049312 | 2/2007 |
| WO | 2010024622 A2 | 3/2010 |

OTHER PUBLICATIONS

EPO, Extended European Search Report relating to application No. 11183606.0 dated Nov. 24, 2011.

(Continued)

*Primary Examiner* — Dave Czekaj
*Assistant Examiner* — Mohammad J Rahman
(74) *Attorney, Agent, or Firm* — Rowand LLP

(57) ABSTRACT

Encoding and decoding methods are presented that used offset-based adaptive reconstruction levels. The offset data is inserted in the bitstream with the encoded video data. The offset data may be differential data and may be an index to an array of offset values from which the differential offset is calculated by the decoder. The offset to an adaptive reconstruction level may be adjusted for each slice. The offsets may be specific to a particular level/index and data type. In some cases, offsets may only be sent for a subset of the levels. Higher levels may apply no offset, may apply an average offset, or may apply the offset used for the highest level having a level-specific offset.

27 Claims, 12 Drawing Sheets

(56) References Cited

OTHER PUBLICATIONS

WEDI: "Quantization with Adaptive Dead-Zone Size", 11. JVT Meeting; 68. MPEG Meeting; Mar. 15, 2004-Mar. 19, 2004; Munich, DE; (Joint Video Team of ISO/IEC JTC1/SC29/WG11 and ITU-T SG.16) No. JVT-K026, Mar. 19, 2004 XP030005843, ISSN: 0000-0421 *section 3*.

Xiang Yu et al: "Quantization with Hard-Decision Partition and Adaptive Reconstruction Levels for Low Delay Setting", 4. JCT-VC Meeting; 95. MPEG Meeting; Jan. 20, 2011-Jan. 28, 2011; Daegu; (Joint Collaborative Team on Video Coding of ISO/IEC JTC1/SC2G11and ITU-T SG.16); URL: http://wftp3.itu.int/av-arch/jstvc-site/, No. JCTVC-D384, Jan. 16, 2011, XP030008423, ISSN: 0000-0013 *section 2*.

Jing Wang et al: "Hard-decision quantization with adaptive reconstruction levels for High Efficiency Video Coding", Information Theory (CWIT), 2011 12th Canadian Workshop ON, IEEE, May 17, 2011, pp. 62-65, XP031944038, DOI: 10.1109/CWIT.2011.5872124 ISBN: 978-1-4577-0743-8 *section III*.

Xiang Yu et al: "Adaptive quantization with balanced distortion distribution and its application to H.264 intra coding" Image Processing (ICIP), 2009 16th IEEE International Conference on, IEEE, Piscataway, NJ, USA LNKD DOI:10.1109/ICIP.2009.5413738, Nov. 7, 2009, pp. 1049-1052, XP031628437.

En-hui Yang et al: "Soft Decision Quantization for H.264 With Main Profile Compatibility" IEEE Transactions on Circuits and Systems for Video Technology, IEEE Service Center, Piscataway, NJ, US LNKD 001:10.1109fTCSVT.2008.2009260, vol. 19, No. 1, Jan. 1, 2009, pp. 122-127, XP011280553.

En-hui Yang et al: "Rate Distortion Optimization for H.264 Interframe Coding: A General Framework and Algorithms" IEEE Transactions on Image Processing, IEEE Service Center, Piscataway, NJ, US LNKD—D0I:10.1109fTIP.2007.896685, vol. 16, No. 7, Jul. 1, 2007, pp. 1774-1784, XP011185448.

Matthew Crouse et al: "Joint Thresholding and Quantizer Selection for Transform Image Coding: Entropy-Constrained Analysis and Applications to Baseline JPEG" IEEE Transactions on Image Processing, IEEE Service Center, Piscataway, NJ, US, vol. 6, No. 2, Feb. 1, 1997, XP011026108.

Jiangtao Wen et al: "Trellis-Based R-D Optimal Quantization in H.263+" IEEE Transactions on Image Processing, IEEE Service Center, Piscataway, NJ, US, vol. 9, No. 8, Aug. 1, 2000, XP011025644.

Extended European Search Report dated Oct. 14, 2010.

T. Wiegand and G. J. Sullivan and A. Luthra, ITU-T Rec. H.264/ISOIIEC 14496-10 AVC, Joint Video Team of ISO/IEC MPEG and ITU-T VCEG.

E.-h. Yang and X. Yu, On joint optimization of motion compensation, quantization and baseline entropy coding in H.264 with complete decoder compatibility, Proceedings of IEEE International Conference on Acoustics, Speech, and Signal Processing, pp. II325-II328, Mar. 2005.

E.-h. Yang and X. Yu, Rate Distortion Optimization of H.264 with Main Profile Compatibility, IEEE International Symposium on Information Theory, pp. 282-286, Jul. 2006.

S. Lloyd, "Least Squares Quantization in PCM", IEEE Trans. on Information Theory, vol. IT-28, No. 2, pp. 129-137, Mar. 1982.

H.S. Malvar, A. Hallapuro, M. Karczewicz, L. Kerofsky, "Low-complexity transform and quantization in H.264/AVC," IEEE Transactions on Circuits and Systems for Video Technology, vol. 13, Issue 7, pp. 598-603, Jul. 2003.

A. Tanizawa, T. Chujoh, "Simulation results of Adaptive Quantization Matrix Selection on KTA software," ITU-SG16/Q6, Document VCEG—AC07, Klagenfurt, Austria, Jul. 17-18, 2006.

International Search Report dated Nov. 16, 2011, PCT/CA2011/050350.

* cited by examiner

METHODS AND DEVICES FOR DATA COMPRESSION USING OFFSET-BASED ADAPTIVE RECONSTRUCTION LEVELS

CROSS-REFERENCE TO RELATED APPLICATIONS

The present application claims priority to U.S. provisional Ser. No. 61/446,528 filed Feb. 25, 2011, the contents of which are hereby incorporated by reference.

FIELD

The present application generally relates to data compression and, in particular, to methods and devices for using adaptive reconstruction levels in quantization and de-quantization.

BACKGROUND

Data compression occurs in a number of contexts. It is very commonly used in communications and computer networking to store, transmit, and reproduce information efficiently. It finds particular application in the encoding of images, audio and video. Video presents a significant challenge to data compression because of the large amount of data required for each video frame and the speed with which encoding and decoding often needs to occur. The current state-of-the-art for video encoding is the ITU-T H.264/AVC video coding standard. It defines a number of different profiles for different applications, including the Main profile, Baseline profile and others. A next-generation video encoding standard is currently under development through a joint initiative of MPEG-ITU: High Efficiency Video Coding (HEVC).

There are a number of standards for encoding/decoding images and videos, including H.264, that use block-based coding processes. In these processes, the image or frame is divided into blocks, typically 4×4 or 8×8, and the blocks are spectrally transformed into coefficients, quantized, and entropy encoded. In many cases, the data being transformed is not the actual pixel data, but is residual data following a prediction operation. Predictions can be intra-frame, i.e. block-to-block within the frame/image, or inter-frame, i.e. between frames (also called motion prediction). It is expected that HEVC will also have these features.

When spectrally transforming residual data, many of these standards prescribe the use of a discrete cosine transform (DCT) or some variant thereof. The resulting DCT coefficients are then quantized using a quantizer that employs a uniform quantization step size, i.e. a uniform partitioning of the data space.

Work in lossy compression, e.g., audio/voice coding, video coding, image coding, etc., tends to focus on improving rate-distortion performance. That is, the objective of most encoding and decoding schemes is to find an optimal balance between distortion and coding rate. A rate-distortion optimization expression of the type $J=D+\lambda R$ is typically used, wherein the Lagrangian multiplier $\lambda$, represents the desired trade-off between coding rate and distortion.

It would be advantageous to provide for an improved encoder, decoder and method of encoding or decoding.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
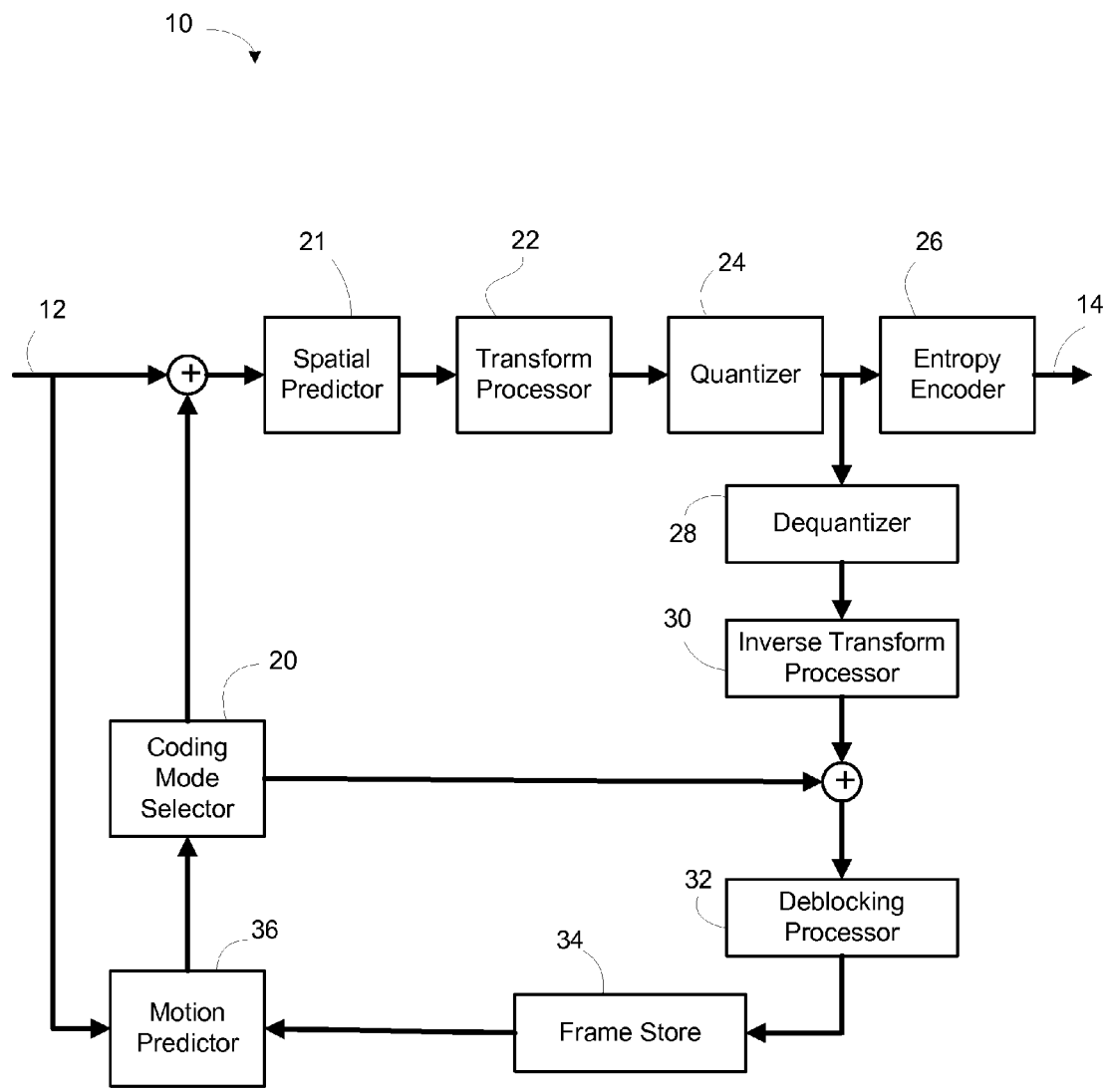
FIG. 1 shows, in block diagram form, an encoder for encoding video.

The present application describes methods and encoders/decoders for achieving rate-distortion improvements in lossy data compression. In some embodiments, the data compression process or devices described herein may be applied to the encoding and decoding of audio data, image data, and/or video data. In particular, the present application describes a method and process of data compression that uses adaptive reconstruction levels within a quantization operation.

In one aspect, the present application describes an adaptive scheme of computing and transmitting the reconstruction levels for scalar quantizers to achieve a better rate distortion coding performance without materially increasing the coding complexity. From the rate distortion coding performance point of view, the example processes herein achieve significant distortion reduction while requiring a very small number of bits. From the coding complexity point of view, the at least one example method is simple and fast because it involves solving a quadratic optimization problem on the encoder side. On the decoder side, the at least one example method with adaptive reconstruction levels does not increase the computational complexity, and involves only some extra memory consumption.

In another aspect, the present application describes a method of decoding a bitstream of encoded compressed data. The method includes entropy decoding the encoded compressed data to obtain indices and to obtain offset data associated with at least one of the indices; determining an associated reconstruction level for each index, wherein the associated reconstruction level for said at least one of the indices is determined by adjusting a predetermined reconstruction level using the offset data; and reconstructing a data point for each obtained index using that index's associated reconstruction level.

In yet another aspect, the present application describes a method for encoding transform domain coefficients for a group of coding units, wherein the transform domain coefficients are quantized by a quantizer that associates each transform domain coefficient with an index based upon in which sub-part of a partitioned data space that transform domain coefficient is found. The method includes determining the average transform domain coefficient for each sub-part; calculating an offset for each sub-part by determining a difference between the average transform domain coefficient for that sub-part and a predetermined reconstruction level for that sub-part; and entropy encoding the indices associated with the transform domain coefficients, and entropy encoding at least one of the offsets, to output a bitstream of encoded data.

In another aspect, the present application provides a method of decoding a bitstream of compressed data. The method includes extracting offset data from the bitstream, wherein the offset data is associated with an index; calculating a reconstruction level for the index by adjusting a predetermined reconstruction level using the offset data; decoding the compressed data to obtain a plurality of quantized transform coefficients; and dequantizing each quantized transform coefficient that corresponds to the index to generate a data point using the index's calculated reconstruction level.

In yet a further aspect, the present application describes a method for encoding transform domain coefficients for a group of coding units, wherein the transform domain coefficients are quantized by a quantizer that associates each transform domain coefficient with an index based upon in which sub-part of a partitioned data space that transform domain coefficient is located. The method includes determining the average transform domain coefficient at least one of the sub-parts; calculating an offset for that sub-part by determining a difference between the average transform domain coefficient for that sub-part and a predetermined reconstruction level for that sub-part; and entropy encoding the indices associated with the transform domain coefficients to output a bitstream of encoded data and inserting into the bitstream offset data from which the offset for that sub-part can be calculated.

In a further aspect, the present application describes encoders and decoders configured to implement such methods of encoding and decoding.

In yet a further aspect, the present application describes computer-readable media storing computer-executable program instructions which, when executed, configured a processor to perform the described methods of encoding and/or decoding.

In yet an additional aspect, the present application describes a processor-readable medium storing a bitstream of encoded compressed data, wherein the compressed data, when decoded, is structured to include a plurality of consecutive portions, and wherein each portion includes video data containing indices representing quantized transform domain coefficients obtained through a video encoding process for a group of coding units, and offset data for adjusting one or more predetermined reconstruction levels used in dequantizing the quantized transform domain coefficients.

Other aspects and features of the present application will be understood by those of ordinary skill in the art from a review of the following description of examples in conjunction with the accompanying figures.

In the description that follows, some example embodiments are described with reference to the H.264 standard for video coding. Those ordinarily skilled in the art will understand that the present application is not limited to H.264 but may be applicable to other video coding/decoding standards, including possible future standards, such as HEVC, multiview coding standards, scalable video coding standards, and reconfigurable video coding standards. It will also be appreciated that the present application is not necessarily limited to video coding/decoding and may be applicable to audio coding/decoding, image coding/decoding, or the lossy coding/decoding of any other data. The present application is broadly applicable to any lossy data compression process that employs quantization irrespective of the type of data being coded/decoded.

In the description that follows, when referring to video or images the terms frame, slice, tile and rectangular slice group may be used somewhat interchangeably. Those of skill in the art will appreciate that, in the case of the H.264 standard, a frame may contain one or more slices. It will also be appreciated that certain encoding/decoding operations are performed on a frame-by-frame basis, some are performed on a slice-by-slice basis, some tile-by-tile, and some by rectangular slice group, depending on the particular requirements of the applicable image or video coding standard. In any particular embodiment, the applicable image or video coding standard may determine whether the operations described below are performed in connection with frames and/or slices and/or tiles and/or rectangular slice groups, as the case may be. Accordingly, those ordinarily skilled in the art will understand, in light of the present disclosure, whether particular operations or processes described herein and particular references to frames, slices, tiles, rectangular slice groups are applicable to frames, slices, tiles, rectangualar slice groups, or some or all of those for a given embodiment. This also applies to coding units, groups of coding units, etc., as will become apparent in light of the description below.

In the discussion that follows, reference is made to DCT coefficients and the DCT domain; however, it will be appreciated that this application is not limited the encoding of DCT coefficients, the encoding of block-based transform coefficients, the encoding of block-based data, or any particular data type.

To the extent that the processes or methods described below are applied to images and/or video they may be applied to a portion of a video or image, such as a frame, a slice, a Group-of-Pictures (GOP), or on any other basis, such as to a coding unit, or group of coding units. To the extent that the process or methods described herein are applied to audio, such as music or voice data, they may be applied to a grouping or sequence of data points, e.g. an audio sample.

Figure 2:
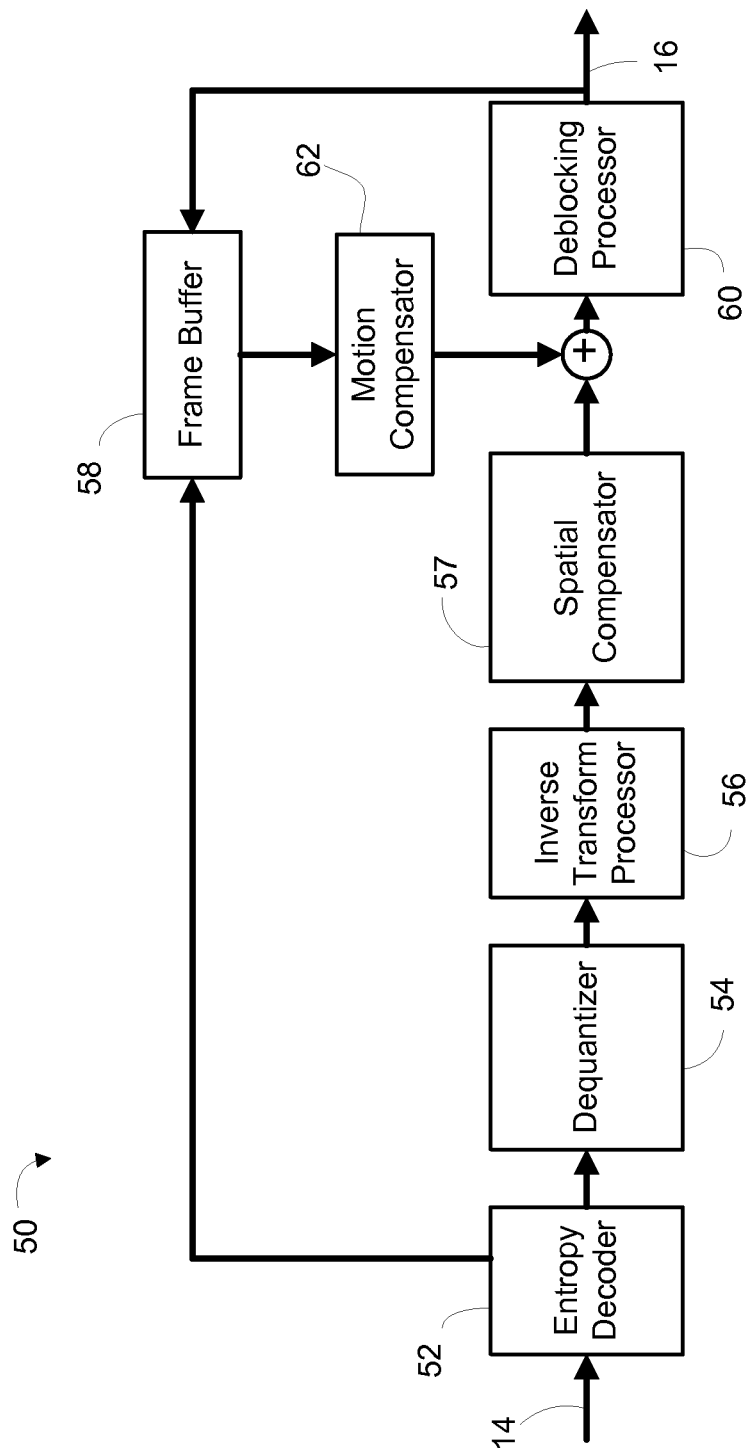
FIG. 2 shows, in block diagram form, a decoder for decoding video.

Reference is now made to FIG. 1, which shows, in block diagram form, an encoder 10 for encoding video. Reference is also made to FIG. 2, which shows a block diagram of a decoder 50 for decoding video. It will be appreciated that the encoder 10 and decoder 50 described herein may each be implemented on an application-specific or general purpose computing device, containing one or more processing elements and memory. The operations performed by the encoder 10 or decoder 50, as the case may be, may be implemented by way of application-specific integrated circuit, for example, or by way of stored program instructions executable by a general purpose processor. The device may include additional software, including, for example, an operating system for controlling basic device functions. The range of devices and platforms within which the encoder 10 or decoder 50 may be implemented will be appreciated by those ordinarily skilled in the art having regard to the following description.

The encoder 10 receives a video source 12 and produces an encoded bitstream 14. The decoder 50 receives the encoded bitstream 14 and outputs a decoded video frame 16. The encoder 10 and decoder 50 may be configured to operate in conformance with a number of video compression standards. For example, the encoder 10 and decoder 50 may be H.264/AVC compliant. In other embodiments, the encoder 10 and decoder 50 may conform to other video compression standards, including evolutions of the H.264/AVC standard, like HEVC.

The encoder 10 includes a spatial predictor 21, a coding mode selector 20, transform processor 22, quantizer 24, and entropy encoder 26. As will be appreciated by those ordinarily skilled in the art, the coding mode selector 20 determines the appropriate coding mode for the video source, for example whether the subject frame/slice is of I, P, or B type, and whether particular coding units (e.g. macroblocks) within the frame/slice are inter or intra coded. The transform processor 22 performs a transform upon the spatial domain data. In particular, the transform processor 22 applies a block-based transform to convert spatial domain data to spectral components. For example, in many embodiments a discrete cosine transform (DCT) is used. Other transforms, such as a discrete sine transform or others may be used in some instances. The block-based transform is performed on a macroblock or sub-block basis, depending on the size of the macroblocks. In the H.264 standard, for example, a typical 16×16 macroblock contains sixteen 4×4 transform blocks and the DCT process is performed on the 4×4 blocks. In some cases, the transform blocks may be 8×8, meaning there are four transform blocks per macroblock. In yet other cases, the transform blocks may be other sizes. In some cases, a 16×16 macroblock may include a non-overlapping combination of 4×4 and 8×8 transform blocks.

Applying the block-based transform to a block of pixel data results in a set of transform domain coefficients. A "set" in this context is an ordered set in which the coefficients have coefficient positions. In some instances the set of transform domain coefficients may be considered a "block" or matrix of coefficients. In the description herein the phrases a "set of transform domain coefficients" or a "block of transform domain coefficients" are used interchangeably and are meant to indicate an ordered set of transform domain coefficients.

The set of transform domain coefficients is quantized by the quantizer 24. The quantized coefficients and associated information are then encoded by the entropy encoder 26.

Intra-coded frames/slices (i.e. type I) are encoded without reference to other frames/slices. In other words, they do not employ temporal prediction. However intra-coded frames do rely upon spatial prediction within the frame/slice, as illustrated in FIG. 1 by the spatial predictor 21. That is, when encoding a particular block the data in the block may be compared to the data of nearby pixels within blocks already encoded for that frame/slice. Using a prediction algorithm, the source data of the block may be converted to residual data. The transform processor 22 then encodes the residual data. H.264, for example, prescribes nine spatial prediction modes for 4×4 transform blocks. In some embodiments, each of the nine modes may be used to independently process a block, and then rate-distortion optimization is used to select the best mode.

The H.264 standard also prescribes the use of motion prediction/compensation to take advantage of temporal prediction. Accordingly, the encoder 10 has a feedback loop that includes a de-quantizer 28, inverse transform processor 30, and deblocking processor 32. These elements mirror the decoding process implemented by the decoder 50 to reproduce the frame/slice. A frame store 34 is used to store the reproduced frames. In this manner, the motion prediction is based on what will be the reconstructed frames at the decoder 50 and not on the original frames, which may differ from the reconstructed frames due to the lossy compression involved in encoding/decoding. A motion predictor 36 uses the frames/slices stored in the frame store 34 as source frames/slices for comparison to a current frame for the purpose of identifying similar blocks. Accordingly, for macroblocks to which motion prediction is applied, the "source data" which the transform processor 22 encodes is the residual data that comes out of the motion prediction process. For example, it may include information regarding the reference frame, a spatial displacement or "motion vector", and residual pixel data that represents the differences (if any) between the reference block and the current block. Information regarding the reference frame and/or motion vector may not be processed by the transform processor 22 and/or quantizer 24, but instead may be supplied to the entropy encoder 26 for encoding as part of the bitstream along with the quantized coefficients.

Those ordinarily skilled in the art will appreciate the details and possible variations for implementing H.264 encoders.

The decoder 50 includes an entropy decoder 52, dequantizer 54, inverse transform processor 56, spatial compensator 57, and deblocking processor 60. A frame buffer 58 supplies reconstructed frames for use by a motion compensator 62 in applying motion compensation. The spatial compensator 57 represents the operation of recovering the video data for a particular intra-coded block from a previously decoded block.

The bitstream 14 is received and decoded by the entropy decoder 52 to recover the quantized coefficients. Side information may also be recovered during the entropy decoding process, some of which may be supplied to the motion compensation loop for use in motion compensation, if applicable. For example, the entropy decoder 52 may recover motion vectors and/or reference frame information for inter-coded macroblocks.

The quantized coefficients are then dequantized by the dequantizer 54 to produce the transform domain coefficients, which are then subjected to an inverse transform by the inverse transform processor 56 to recreate the "video data". It will be appreciated that, in some cases, such as with an intra-coded macroblock, the recreated "video data" is the residual data for use in spatial compensation relative to a previously decoded block within the frame. The spatial compensator 57 generates the video data from the residual data and pixel data from a previously decoded block. In other cases, such as inter-coded macroblocks, the recreated "video data" from the inverse transform processor 56 is the residual data for use in motion compensation relative to a reference block from a different frame. Both spatial and motion compensation may be referred to herein as "prediction operations".

The motion compensator 62 locates a reference block within the frame buffer 58 specified for a particular inter-coded macroblock. It does so based on the reference frame information and motion vector specified for the inter-coded macroblock. It then supplies the reference block pixel data for combination with the residual data to arrive at the reconstructed video data for that macroblock.

A deblocking process may then be applied to a reconstructed frame/slice, as indicated by the deblocking processor 60. After deblocking, the frame/slice is output as the decoded video frame 16, for example for display on a display device. It will be understood that the video playback machine, such as a computer, set-top box, DVD or Blu-Ray player, and/or mobile handheld device, may buffer decoded frames in a memory prior to display on an output device.

It is expected that HEVC-compliant encoders and decoders will have many of these same or similar features.

Quantization

For a given block of pixels x with a prediction p, the residual is z=x−p. In this example, the block of pixels x and residual z are the same size as the transform matrix t. The residual z is transformed (for example by using a DCT) to generate the set of transform domain coefficients c. The coefficients c are quantized using a selected quantization step size q to produce a set of quantized coefficients u. This may be expressed as:

$$u = \text{round}(c/q + f) \quad (1)$$

where an input c is quantized to a by applying the quantization step size q, and 1>f>0 is a rounding offset. Because the quantization output is calculated by a deterministic function, this is also called hard-decision quantization.

The quantization operation can be viewed from a rate-distortion point-of-view. In fact, the quantization operation can be refined so as to select indices u such that the selected indices result in a minimum rate-distortion cost. The minimum rate-distortion cost may be expressed as follows:

$$\min_u |c - u \cdot q|^2 + \lambda \cdot r(u) \quad (2)$$

In Equation (2), c is the matrix of transform coefficients, q is the quantization step size, and u is the corresponding matrix of indices to which the coefficients have been quantized. The symbol · stands for element-wise multiplication between matrixes. λ is the Lagrangian multiplier, a constant that is determined by end users based on their preference of the coding rate and the video quality. A relatively small λ puts more preference on better quality, while a larger λ emphasizes on a lower coding rate. r(u) represents the rate function by entropy coding for the indices u, and r(u) represents the rate function for encoding and transmitting u. The entropy coding may be any suitable or applicable entropy coding scheme. In the case of JPEG images, for example, the coding may be Huffman coding. In the case of H.264 video, the coding may be CAVLC or CABAC coding. Yet other context-dependent or context-independent coding schemes may be applicable in particular embodiments. Clearly, the quantization output from Equation (2) is not given by a deterministic function anymore, but is the output of an optimization process that relates to both the rate and the distortion. Thus, it is named soft-decision quantization.

Example embodiments of soft-decision quantization are described in US patent publication no. 2007/0217506 filed by Yang et al. (hereinafter "Yang"). The Yang publication describes the optimization of u given a fixed q. This is termed "soft-decision quantization", since the transform domain coefficients themselves are treated as free-parameters in the rate-distortion optimization. The application of soft-decision quantization to H.264 encoding using CAVLC is described in Yang, and it may include the use of a trellis to search for a set of quantized coefficients u that result in a minimum cumulative rate-distortion for a given entropy encoding scheme. In the example described in Yang, the H.264 CAVLC encoding scheme was used for illustration.

In H.264 and in many other coding schemes the quantization step sizes are predetermined, and in a particular instance the encoder selects one of the quantization step sizes to use for quantizing a particular set of data points, whether a block, slice, frame, etc. The encoder then only needs to transmit an index or indicator so as to inform the decoder which quantization step size was used.

Figure 3:
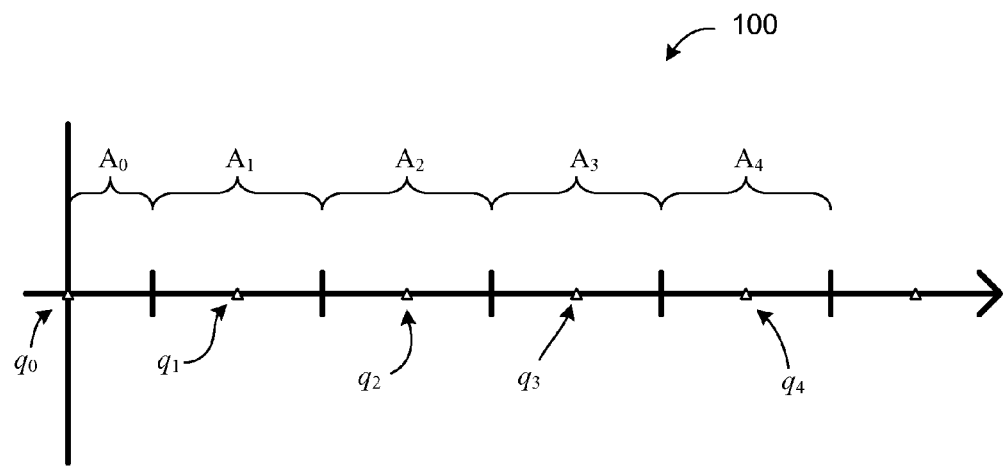
FIG. 3 shows an example of a partitioned data space.

Reference is now made to FIG. 3, which graphically illustrates a portion of a data space 100. In this example, the data space 100 contains the set of data points to be quantized using a selected quantization scheme. Conceptually, in order to perform quantization, the data space 100 may be considered to be partitioned into sub-parts $A_0, A_1, \ldots A_N$, where N+1 is the number of sub-parts. Each sub-part may be referenced by its index u, where u=0, 1, . . . , N. A data point falling within one of the sub-parts $A_i$ is quantized to index u=i. Reconstruction levels $q_u$ are at the midpoint of their respective sub-parts. When the decoder reconstructs a data point, it reconstructs it as reconstruction level $q_u$; in the case of u=i the data point is reconstructed as $q_i$ irrespective of where within the sub-part $A_i$ the actual data point was located. With a quantization step size of q, each reconstruction level $q_i$ is given by i·q. If the source data is uniform, then the assumption of a midpoint reconstruction level will result in minimal distortion; however the assumption of a uniform distribution of source data may be inaccurate in many cases.

Figure 4:
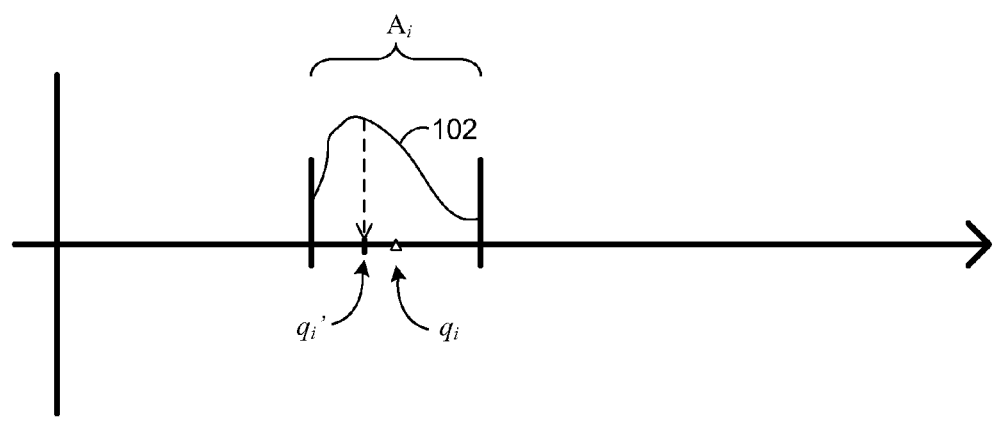
FIG. 4 shows an example of data point distribution within a sub-part of the partitioned data space.

Reference is now made to FIG. 4, which shows an example sub-part $A_i$. The midpoint reconstruction level is shown as $q_i$. The non-uniform distribution of the source data points is shown as reference numeral 102. It will be appreciated that data points with a distribution as shown by 102 would be better represented by an adaptive reconstruction level at or near $q_i'$. The adaptive reconstruction level may be based upon the actual distribution of data points that are associated with or assigned the index i, i.e. that are located within the sub-part $A_i$. The adaptive reconstruction level may be based upon the arithmetic mean or median or mode, in some embodiments. By adjusting the reconstruction level to reflect the distribution of the actual data points within a sub-part $A_i$, the presently described process compensates for some of the distortion attributable to the non-uniform distribution of the data points when relying upon an assumption of uniformity.

In many data compression processes, when quantization is performed the partitioning of the data space and selection of the reconstruction levels are not considered separately. For example, in ITU-T H.264/AVC, both are subsumed under the selection of a quantization step size. The present applicants have recognized that the partitioning of the data space and the selection of a reconstruction level for each sub-part may be considered separately, and need not be based upon a predetermined reconstruction level, for example at the midpoint of the sub-part as in ITU-T H.264/AVC.

Thus, the quantization under this process becomes a two-stage operation. First, the data points are assigned to a quantization index (i.e. based on the partitioning of the data space, the data points are grouped into sub-parts). The partitioning/quantization at this first stage may be uniform, non-uniform, predetermined hard-decision quantization, or soft-decision quantization. The step size/partition size may be selected from amongst a preset number of candidate step sizes/partition sizes based on a rate-distortion optimization process. In all these possible variations, the data points are each assigned one of the indices for the selected quantization partition structure.

Second, the adaptive reconstruction level for each sub-part of the partitioned data space (e.g. each index) is determined. The adaptive reconstruction level may be based upon an averaging of actual data points falling within the sub-part. The averaging may occur over a block or coding unit, group of blocks or coding units, slice, frame, group-of-pictures (GOP) or other suitable collection of data points given the specific application. It may also occur over a group of coding units or frames having a common quantization parameter qP. In some cases the same frame or GOP may have coding units with different qP, in which case those coding units having the same qP may be considered a group of coding units for the purpose of determining adaptive reconstruction levels for that group of coding units.

The selection of the adaptive reconstruction level for each index may be based upon a rate-distortion analysis. In other words, it may be based upon selecting a reconstruction level that minimizes the total distortion given the actual data points within the sub-part. It may further be based upon minimizing a cost function including distortion from the difference between the reconstruction level and the actual data points and the rate cost associated with transmitting the reconstruction level. The rate cost associated with transmitting the reconstruction level may be based upon the encoding scheme used to entropy encode the reconstruction levels.

Figure 5:
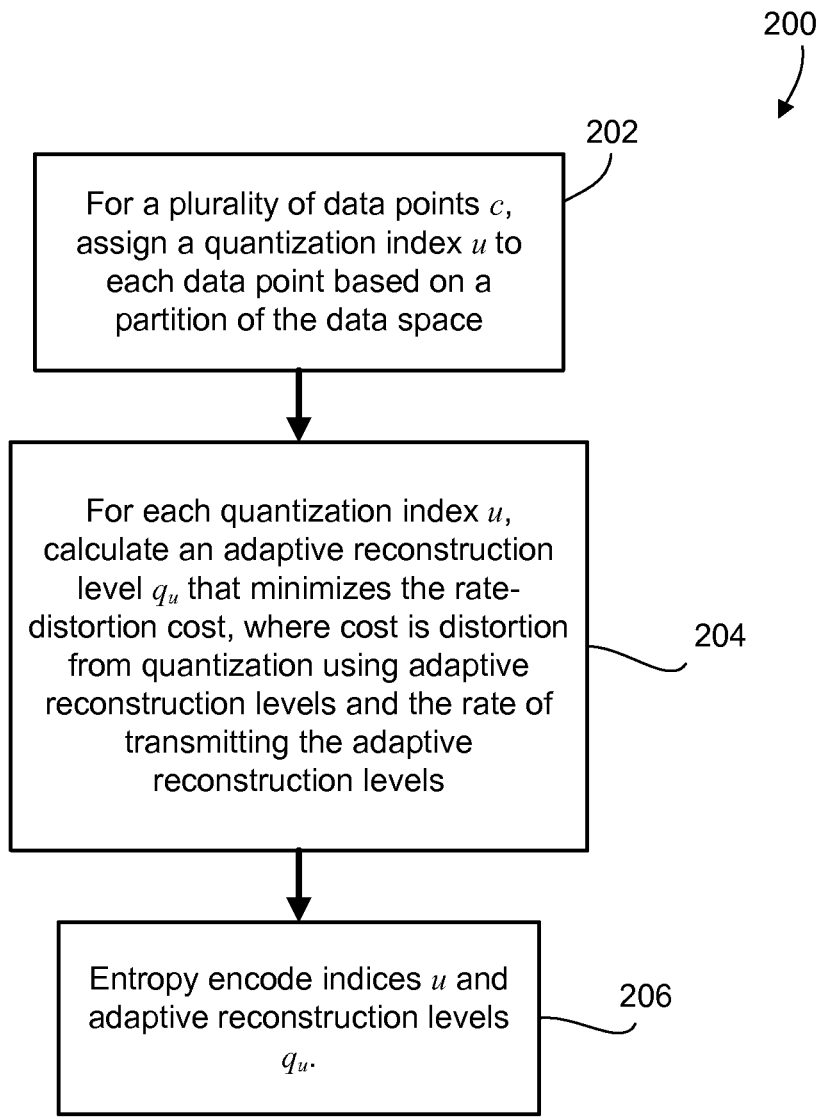
FIG. 5 shows, in flowchart form, an example method for encoding data points using quantization with adaptive reconstruction levels.

Reference is now made to FIG. 5, which shows, in flowchart form, a method 200 of quantizing data. The method 200 is for quantizing and encoding a plurality data points. The data points fall within a data space that may be considered to be partitioned into a set of sub-parts for the purpose of the quantization. Each of the sub-parts has an associated quantization index.

In operation 202, a quantization index is assigned to each of the data points. In other words, each data point falling within a sub-part is assigned the quantization index of that sub-part. The quantization that occurs in operation 202 may be hard-decision quantization or soft-decision quantization. The partitioning of the data space may be uniform or non-uniform.

Once the data points have been quantized in operation 202, i.e. have each been assigned a quantization index, then in operation 204 an adaptive reconstruction level is calculated for each quantization index. The adaptive reconstruction level of a given index is calculated based on minimizing the joint cost of the total distortion from quantizing the data points within that sub-part and the rate of transmitting the adaptive reconstruction level. A Lagrangian rate-distortion cost expression may be used to determine the minimum cost and select the corresponding adaptive reconstruction level.

Once the adaptive reconstruction level for each index has been calculated in operation 204, then in operation 206 the adaptive reconstruction levels and the quantized data points are entropy encoded. It will be understood that the data points themselves are not encoded, but rather the quantization indices that have been assigned to them by the quantization of operation 202. Any suitable entropy encoding process or scheme may be used to encode the reconstruction levels. Selection of a suitable entropy encoding method, including selection of no encoding, is within the skill of an ordinary person familiar with the art.

In one example embodiment, given the quantization indices $u^n$ for a group of blocks $c^n$, the adaptive reconstruction levels are calculated to minimize a joint cost of the total distortion and the extra rate for transmitting the reconstruction levels. For each quantization index u, let $c_{u,1}, c_{u,2}, \ldots, c_{u,m}$ denote the input source symbols (for example, DCT coefficients in H.264 before quantization) which are quantized to u, where m is an integer depending upon u. Then we find $q_u$ such that $q_u$ minimizes $$(c_{u,1} - u \cdot q_u)^2 + (c_{u,2} - u \cdot q_u)^2 + \ldots + (c_{u,m} - u \cdot q_u)^2 + \lambda \cdot r(q_u) \quad (3)$$

where $r(q_u)$ denotes the length function of a prefix code for $q_u$ according to the selected entropy encoding scheme.

Figure 6:
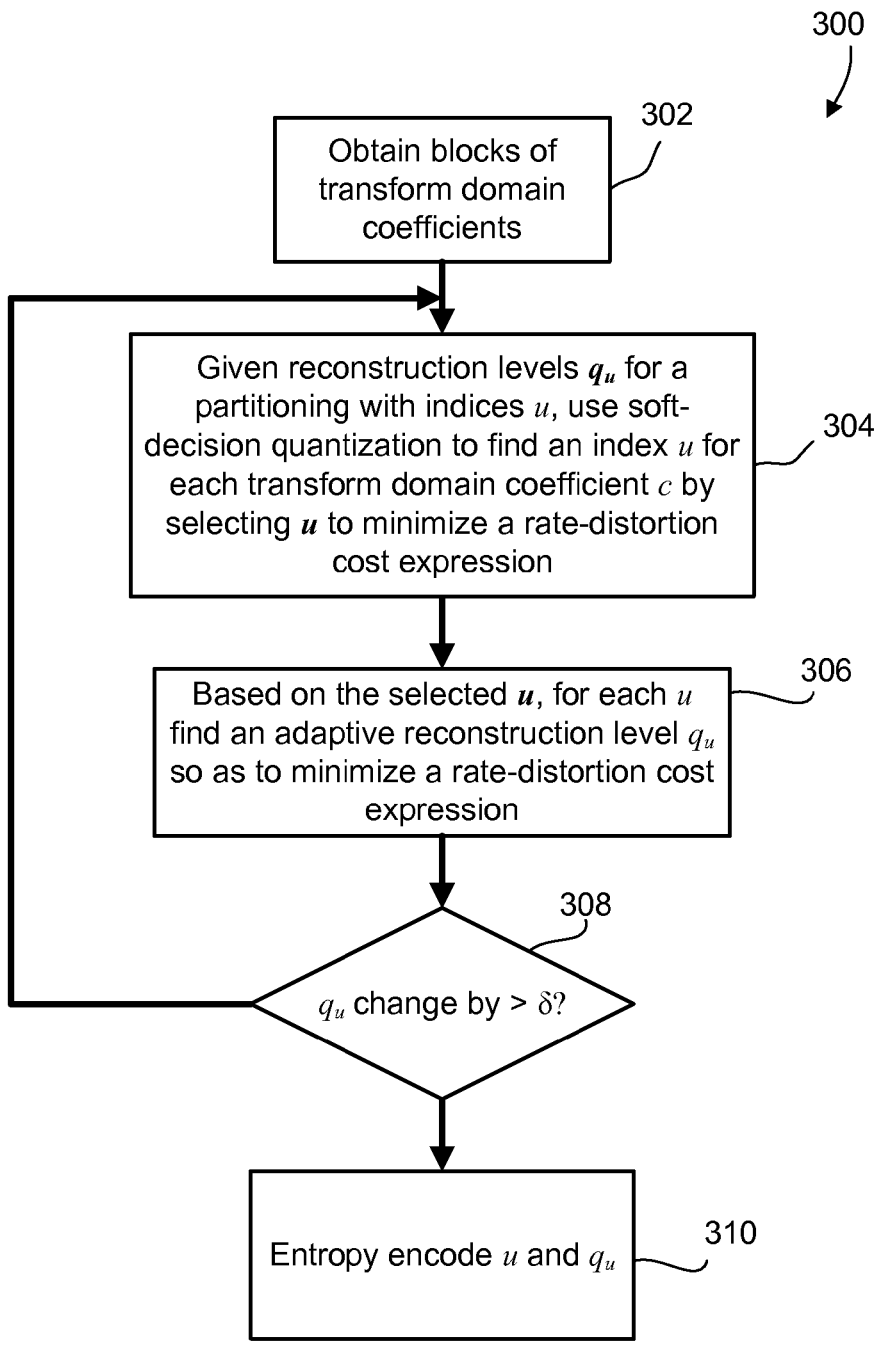
FIG. 6 shows, in flowchart form, an example method for encoding video data using soft-decision quantization with adaptive reconstruction levels.

Reference is now made to FIG. 6, which shows, in flowchart form, an example method 300 of encoding video data. This example method 300 illustrates the specific application of the quantization process described above in the context of video encoding. The method 300 may be implemented in a video encoder using hardware, software, or a combination thereof.

In operation 302 blocks of transform domain coefficients c are obtained. It will be appreciated that there are many preceding steps, including performing motion or spatial prediction and obtaining residual values, with or without rate-distortion optimization. The transform domain coefficients c are obtained through spectral transform of the residual data, in some instances using a DCT operation. In many instances, the transform is performed on a block-by-block basis. The H.264 standard, for example, prescribes a DCT operation performed on 4×4 or 8×8 blocks of residual data. The resulting set of transform domain coefficients c include 16 or 64 data points, as the case may be. It will be appreciated that some of the operations described herein may also be performed on a block-by-block basis. However, in many cases the method 300 of determining adaptive reconstruction levels may be performed for groups of blocks at a time, such as a slice, frame, GOP, or other grouping of blocks of data.

In operation 304, given a set of reconstruction levels $q_u$ for a partitioning with indices u, soft decision quantization is performed to quantize the transform domain coefficients c, i.e. to assign an index u for each transform domain coefficient c. The soft decision quantization may include selecting indices a that minimize a total rate-distortion cost. Equation (2) above is an example expression that may be used to find indices resulting in a minimum total rate-distortion cost. The initial set of reconstruction levels $q_u$ may be those reconstruction levels associated with the current quantization step size, as prescribed by the applicable encoding standard. In at least one example, the initial set of reconstruction levels is simply the preselected quantization step size q.

Out of operation 304, the transform domain coefficients c are each quantized and represented by an assigned index u. In operation 306, those assigned indices u are fixed and adaptive reconstruction levels $q_u$ are found that minimize a rate-distortion cost, such as that given by Equation (3) above. After operation 306, each index a has an updated reconstruction level (referred to herein as an adaptive reconstruction level) $q_u$.

The process may be iterative. That is, operations 304 and 306 may be repeated by fixing the reconstruction levels in operation 304 to find indices that minimize the cost expression of Equation (2) and then fixing the indices in operation 306 to find the reconstruction levels that minimize the cost expression of Equation (3), repeatedly. Operation 308 may include an evaluation of whether to stop the iterative loop of operations 304 and 306. In this example operation 308 determines whether the adaptive reconstruction levels $q_u$ have changed by more than a threshold amount γ. If so, then operations 304 and 306 are repeated. If not, then the method 300 moves to operation 310, where the video is entropy encoded. This operation 310 includes entropy encoding the indices u and the adaptive reconstruction levels $q_u$.

Figure 7:
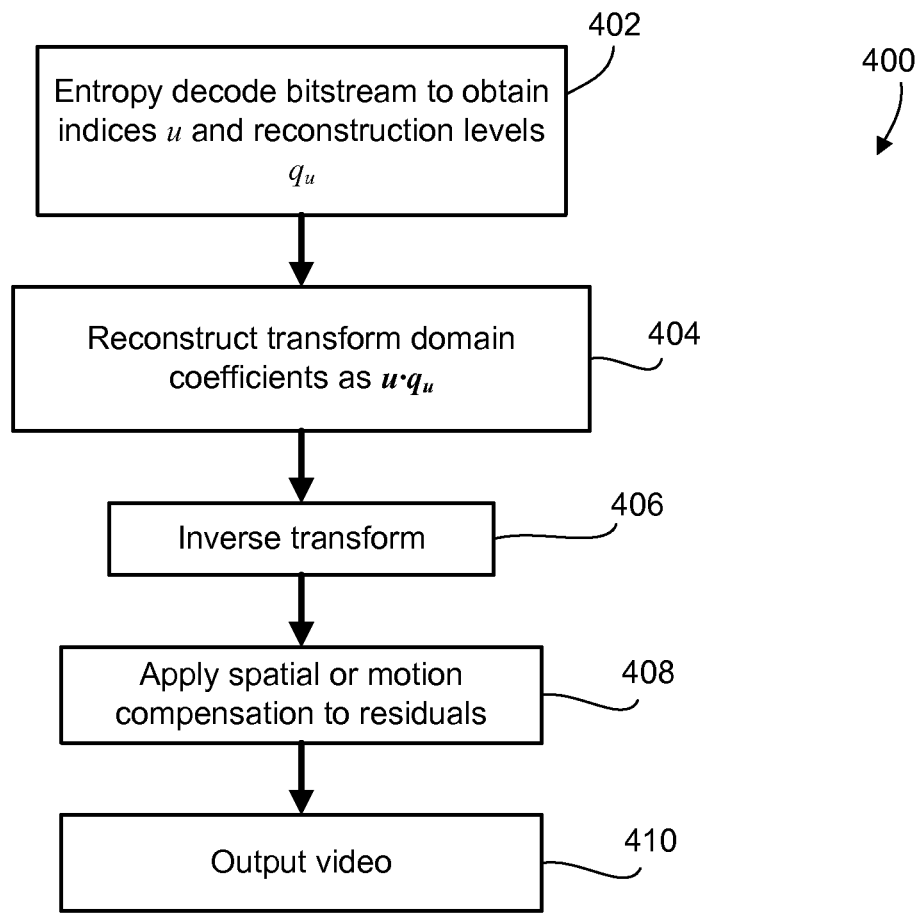
FIG. 7 shows, in flowchart form, an example method of decoding video data that has been encoded using quantization with adaptive reconstruction levels.

Decoding of an encoded video is now illustrated by way of the example method 400 shown in FIG. 7. The example method 400 is preceded by obtaining or receiving the encoded video data, for example over a computer network, a broadcast network, a cellular network, a short-range network, or from a digital recording device such as a DVD or other computer-readable medium. In operation 402 the bitstream of encoded video data is entropy decoded to obtain the indices u and the adaptive reconstruction levels $q_u$. In operation 404, the transform domain coefficients are reconstructed as $u \cdot q_u$. The reconstructed transform domain coefficients are then inverse transformed in operation 406, and suitable spatial or motion compensation is applied, as the case may be, in operation 408. In operation 410 the video is output, for example to a display screen or through a video output port.

It will be appreciated that in some embodiments, an adaptive reconstruction level $q_u$ may not be encoded and transmitted for every sub-part. Some sub-parts may have too few data points to justify sending an adaptive reconstruction level $q_u$ from a rate-distortion point of view. In other cases, some sub-parts may have a data point distribution with a median that does not deviate significantly from the midpoint of the sub-part, meaning that the adaptive reconstruction level $q_u$ is nearly identical to the midpoint and the distortion gain does not outweigh the rate cost associated with sending the adaptive reconstruction level $q_u$.

In some embodiments, the rate distortion cost of transmitting a given reconstruction level may be evaluated. Specifically, a parameter, called the rate value, may be calculated and the adaptive reconstruction level is transmitted if the rate value is greater than the number of bits that is needed to transmit this reconstruction level. In one example embodiment, the rate value may be expressed as:

$$N_i \cdot \left( \frac{1}{N_i} \sum_{n=1}^{N_i} c_n^{(i)} - i \cdot q \right)^2 / \lambda \qquad (4)$$

where $N_i$ is the number of data points in the sub-part $A_i$.

In one embodiment, the encoder and decoder may be configured such that the encoder calculates and transmits adaptive reconstruction levels $q_u$ for lower indices. As soon as the encoder encounters an index in which the adaptive reconstruction level $q_u$ should not be sent, due to a rate-distortion analysis, then the encoder ceases to calculate adaptive reconstruction levels for higher indices and inserts a stop code in the encoding of the adaptive reconstruction levels $q_u$ to indicate to the decoder that no further levels will be sent for higher indices. Other methods or operations for determining which adaptive reconstruction levels to send may be used.

In a case study of residual coding for video compression, a simple scheme of signaling adaptive reconstruction levels for only a few selected sub-parts as the corresponding average of data points within those sub-parts has proved to improve the rate distortion performance significantly.

In one possible embodiment, a finite set of quantizers with various reconstruction levels may be constructed or preconfigured. In the encoding process, the encoder may dynamically select one quantizer from the set of quantizers on the basis that it realizes the best rate-distortion performance, i.e. lowest cost, among the candidate quantizers of the set. The choice of quantizer is then communicated to the decoder in the output bitstream.

In yet a further embodiment, rather than sending reconstruction levels $q_u$, the encoder may send an offset value $\delta$ for each reconstruction level. That is, the adaptive reconstruction level for indices u=i is given by $i \cdot q + \delta_i$. The offset $\delta_i$ for sub-part $A_i$ may be calculated as $\bar{q}_i - i \cdot q$, where $\bar{q}_i$ is the calculated adaptive reconstruction level for that sub-part $A_i$, and $q$ is the non-adaptive quantization step size used to quantize the data points. As noted previously, $\bar{q}_i$ may be calculated by taking the mean (or median, etc.) of the data points within the sub-part $A_i$. That is, the i-th reconstruction level may be represented by the offset (or average deviation) of the data points, $c^{(i)}_n$, from the conventional reconstruction point of q, which is expressed as:

$$\delta_i = \frac{1}{N_i} \sum_{n=1}^{N_i} c_n^{(i)} - i \cdot q \qquad (5)$$

In Equation (5), $N_i$ is the number of data points in the sub-part $A_i$, and $c^{(i)}_n$ is the $n^{th}$ data point within the sub-part $A_i$.

It will be appreciated that in an alternative implementation, the offset $\delta_i$ may be calculated as an offset to the quantization step size q, instead of an offset to the reconstruction level $i \cdot q$. That is the offset $\delta_i$ would result in a reconstruction level of $i \cdot (q+\delta_i)$. Similarly, the offset $\delta_i$ may be calculated as an offset to the index i, which results in a reconstruction level of $(i+\delta_i) \cdot q$. It will be appreciated that any of the embodiments described herein may be implemented using these variations for expressing the offset.

It may be noted that there is a difference between the offset of reconstruction levels shown in Equation (5) and the adaptive rounding offset, f, mentioned above in connection with Equation (1). The rounding offset is applied on the encoder side to change the quantization partitions and it is not needed by the decoder. On the other hand, the reconstruction level offset here is computed on the encoder side and is communicated to the decoder to be used to enhance the reconstruction.

In one example embodiment, the transmitted adaptive reconstruction level information, whether it is explicit reconstruction levels $q_u$ or offsets $\delta_u$, may be normalized. For example, the offsets may be normalized by dividing by q, thereby resulting in a real number within a limited range of (0, 1), which can be represented by a fixed point integer that is relatively easily encoded. Accordingly, in various possible embodiments, the encoder and decoder may be configured to use adaptive reconstruction levels in quantization by sending explicit reconstruction levels, normalized explicit reconstruction levels, offsets for determining the reconstruction levels, or normalized offsets for determining the reconstruction levels. In yet further embodiments, any of these possible implementations may use differential encoding from the previously sent level/offset for a given sub-part.

As mentioned above, the rate-distortion analysis may result in sending adaptive reconstruction level data (whether levels or offsets) for only some of the sub-parts. In simulations and testing it has been found that the rate-distortion analysis often results in sending of adaptive reconstruction data for only the first two sub-parts, e.g. indices u=1 and 2. These are also usually the sub-parts that contain the largest share of the data points. In other words, the majority of data points that are quantized fall into the first couple of indices. Thus, the rate-distortion analysis, for example as described above, may, in one embodiment, be simplified such that the decision to transmit adaptive reconstruction level data for a sub-part is based upon the number of data points quantized to that index. In other words, the encoder may count the number of data points in a sub-part $A_i$, i.e. quantized to index i, and if the number of data points exceeds a threshold number, T, then the adaptive reconstruction level $q_i$ or offset $\delta_i$ for that index u=i is transmitted in the bitstream. In some embodiments, the threshold number may be index-dependent, i.e. $T_i$.

Using the number of data points as a determinant for whether to send an adaptive reconstruction level or offset avoids the need to include signaling in the bitstream as to which indices have adaptive reconstruction levels or offset, because the decoder can count the number of data points for each sub-part $A_i$ by simply counting the indices u=i and thus identify, based on the thresholds, whether an adaptive reconstruction level or offset is in the bitstream. In some embodiments, the thresholds may be preset within the encoder and decoder. In some embodiments, the thresholds may be configurable and may be communicated to the decoder in initial header information of the bitstream.

In one embodiment, the count of data points may not be separately collected for each sub-part. It may be too computationally costly to differentiate all sub-parts and collect counts for all sub-parts. Accordingly, in one embodiment, the total count for all parts is collected and used to estimate the count for each sub-part based on some empirical formula (e.g., the first sub-part corresponds to 80% of the total count), and then a sub-part-specific threshold is applied.

As noted above, it has been found in simulations that the rate-distortion decision on whether to send adaptive reconstruction levels often results in only sending levels/offsets for the first two or three indices. It has also been found that the offsets amongst the remaining sub-parts are somewhat consistent. Accordingly, in some embodiments the encoder may calculate an average of the remaining offsets and may transmit the average offset $\bar{d}$ for use in adjusting the reconstruction levels of those sub-parts for which there is not an explicit transmitted adaptive reconstruction level offset.

Figure 8:
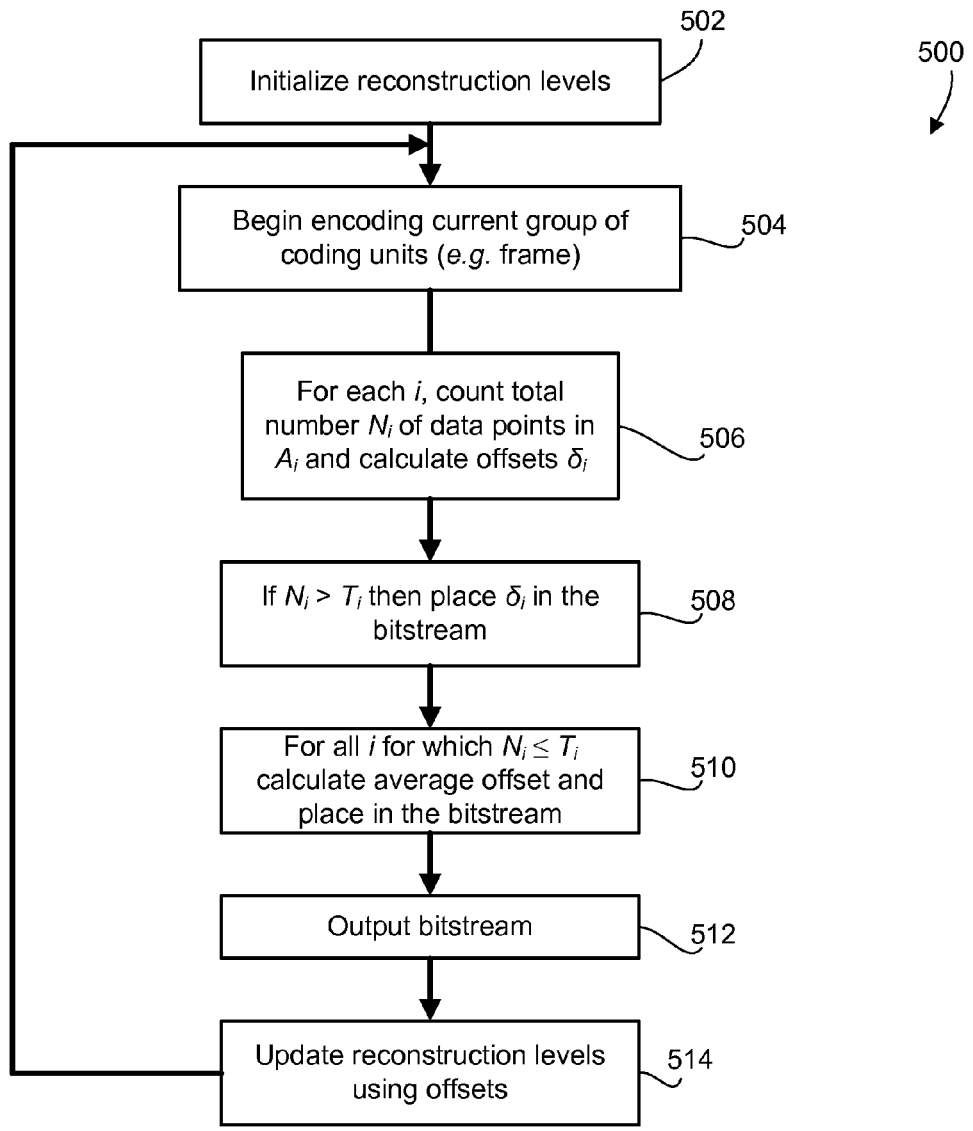
FIG. 8 shows a flow diagram for an example method of encoding indices using offsets for adaptive reconstruction levels.

Reference is now made to FIG. 8, which shows a flow diagram for an example method 500 of encoding data. The method 500 begins in operation 502 with initializing reconstruction levels. In operation 504, encoding of a current frame begins. As will be appreciated, the encoding includes determining coding mode, motion vectors, residual data, etc., for coding units within the frame. The residual data is transformed to realize transform domain coefficients (TCOEFFs), which are then quantized to quantized TCOEFFs, i.e., indices u. The TCOEFFs are data points within the data space $S_i$. The quantization operation converts the data points within respective sub-parts $A_i$ to respective indices u=i. In this embodiment, hard-decision quantization with a fixed quantizer is presumed; however, in other embodiments soft-decision quantization may be employed in operation 504.

As noted in operation 506, the encoder determines, for each sub-part $A_i$ (e.g. index u=i), the offset $\delta_i$ and the number of data points (TCOEFFs) within that sub-part $A_i$. In operation 508, the encoder assesses for each sub-part $A_i$ whether the number of data points $N_i$ in that sub-part exceeds the threshold value $T_i$ for that sub-part. If so, then in operation 506 the calculated offset $\delta_i$ for that subpart $A_i$ is placed in the bitstream.

In operation 510, the encoder calculates an average offset value $\bar{d}$ based on the calculated offset values for those sub-parts that did not have enough data points to meet the criteria of $N_i > T_i$. In some embodiments, the average offset $\bar{d}$ may be calculated over all the sub-parts. In some embodiments, the average offset $\bar{d}$ may be calculated as a weighted average based on the number of data points per sub-part. In this embodiment, the average offset $\bar{d}$ is the weighted average for those sub-parts that did not meet the criteria of $N_i > T_i$. An example formula for the average offset $\bar{d}$ is:

$$\bar{\delta} = \left( \sum_{N_i \leq T_i} \delta_i \cdot N_i \right) \bigg/ \left( \sum_{N_i \leq T_i} N_i \right)$$

It will be appreciated that operations 504, 506, 508, and 510 are not necessarily implemented linearly. For example, the counting of data points and determination as to whether they exceed a threshold can occur within the encoding process of operation 504. As another example, the average offset is not necessarily inserted in the bitstream after the explicit offsets are inserted; in some cases, the average offset may be placed ahead of any explicit offsets.

The bitstream is output as indicated in operation 512.

As indicated in operation 514, in this embodiment the reconstruction levels used to make coding decision in the encoding process of operation 504 are updated using the offset data calculated in operations 506 and 508. In one embodiment, average offset data may be used for those sub-parts that had too few data points; however, in other embodiments, the actual offsets for each sub-part are used in operation 514 to update reconstruction levels. The updated reconstruction levels are then used by the encoder in performing the encoding of the next group of coding units, whether it is a frame, slice, GOP, etc.

It will be appreciated that the process shown in FIG. 8 can be performed with respect to a group of coding units. A group of coding units can be a frame, slice, tile, rectangular slice group, GOP, or other grouping of coding units. In one embodiment, the group of coding units is all coding units within a frame or GOP having the same qP parameter.

In the embodiment shown in FIG. 8, the current frame for which offsets are calculated is not re-encoded using adaptive reconstruction levels. Rather it is transmitted together with the offset data for reconstruction at the decoder. The decoder uses the offsets to adjust the reconstruction levels for the current frame.

In one exemplary embodiment, a set of adaptive reconstruction levels may be assigned to a group of coding units, with each coding unit (CU) covering an M×M area. In some examples, M may be equal to 16, or 32, or 64, or 128 as is proposed in developmental work on HEVC. Suppose that each group of coding units contains J CUs, where J might be a parameter specified in the side information. In one case, the exemplary decoding process with adaptive reconstruction levels may be described as follow:

1. Decode adaptive reconstruction level data (or offset data), for example, from the slice header, to determine a set of adaptive reconstruction levels;
2. Initialize a counter numCUs=0;
3. Decode indices for one CU and reconstruct the CU by reconstructing the data points of the CU from the indices using the adaptive quantization levels;
4. Increase the counter numCUs by one;
5. Repeat operations 2 through 4 until the counter numCUs==J; and
6. Repeat operations 1 through 5 until the slice is completely decoded.

In the above-described embodiment the adaptive reconstruction level data or offset data may be explicit adaptive reconstruction levels or offsets, or may be differentially encoded. That is, the adaptive reconstruction level may be obtained by first using previously determined adaptive reconstruction levels to derive a prediction, and then add the prediction to a decoded prediction residual.

In the embodiment described above, each adaptive reconstruction level or offset, or, equivalently, its prediction residual, may be described by using $N_b$ bits.

In yet another exemplary embodiment, the decoding process for a group of J CUs can be described as follows:
1. Initialize the counter numCUs=0;
2. Decode indices for one CU and store all decoded syntax elements;
3. Increase the counter numCUs by one;
4. Repeat operations 2 and 3 until numCUs==J;
5. Decode adaptive reconstruction level data to determine the set of adaptive reconstruction levels, and reconstruct the J CUs by using these adaptive reconstruction levels; and
6. Repeat operations 1 through 5 until the slice is completely decoded.

While the two embodiments described above use the number of CUs to control the decoding process, i.e. to indicate when the bitstream will contain new adaptive reconstruction level data, another embodiment may use a different parameter. For example, in another embodiment the parameter for the decoding procedure is the total number of non-zero coefficients, as exemplified in the following sample process:
1. Initialize counter NNZtotal=0;
2. Decode indices for one CU, add the number of nonzero coefficients in the current CU to NNZtotal, and store all decoded syntax elements;
3. Repeat operation 2 until NNZtotal reaches a given threshold;
4. Decode adaptive reconstruction level data to determine a set of adaptive reconstruction levels, and reconstruct all stored CUs by using these adaptive reconstruction levels; and
5. Repeat operations 1 through 4 until a whole frame is decoded and reconstructed.

In one implementation of the example process above, the decoding of adaptive reconstruction level data may further be controlled by a set of counters named NNZcounter(i), which count the number of nonzero coefficients falling into the $i^{th}$ subpart. Accordingly, operation 4 of the process above may be implemented as:
4a. Set i=1.
4b. If NNZcounter(i)>ThresholdNNZ, decode an offset $\delta_i$ for the i-th adaptive reconstruction level.
4c. Repeat operation 4a. when i is smaller than a threshold Tc.
4d. If NNZcounter(Tc)>ThresholdNNZ, decode an average offset $\bar{\delta}$, which will be used for all remaining reconstruction levels.

The ThresholdNNZ in the above exemplary process may be determined by empirical observations. One suitable choice for use in some example HEVC coding is 100. The threshold Tc may also determined based on data statistics. One suitable choice for use in some example HEVC coding is 3.

The above exemplary process for decoding offset data (or adaptive reconstruction level data) involves counting the number of nonzero coefficients for many different reconstruction levels, which introduces extra computational complexity to both the encoder and the decoder. In some cases, the complexity increase might be undesired. In these cases, one total counter, named NNZtotal may be used. An example process using this variation is outlined below:
4a. Set i=1.
4b. If NNZtotal>Threshold(i), decode an offset $\delta_i$ for the i-th reconstruction level
4c. Repeat operation 4b. when i is smaller than a threshold Tt.
4d. If NNZtotal>Threshold(Tt), decode an average offset for all remaining reconstruction levels.

The variable Threshold(i) in the above exemplary embodiment may be determined based on the empirical observation of the ratio among the number of different reconstruction levels. One possible choice of the ratio in video codecs, such as HEVC, may be 14:2:1, in a case where the threshold is set to Tt=3. Correspondingly, one choice of those thresholds might be Thr*17/14, Thr*17/2, and Thr*17, where Thr is a constant, for which 60 may be a suitable choice in some cases, meaning that it is likely worth transmitting adaptive reconstruction level data (e.g. offset data) for every 60 nonzero coefficients.

The $N_b$-bit representation of a reconstruction offset in the above exemplary embodiment may vary for different applications. For HEVC, observations show that 5-bit precision is sufficient for achieving acceptable rate distortion performance. In one example implementation, this 5-bit representation is achieved using a two-step process. First, the whole range of (0, q) is represented with a 9-bits precision uniformly. Second, the 9-bits numbers are quantized to 5-bit, following a rule of ensuring a uniform distribution of $\delta^2$. Note that the rate value of each reconstruction offset is proportional to $\delta^2$.

A finite precision, e.g. an $N_b$-bit, representation of a reconstruction offset may be further entropy coded by either using variable-length coding or arithmetic coding to reduce the average rate.

In another example embodiment, transmission and usage of adaptive reconstruction levels may mainly be controlled by the total number of nonzero coefficients. Specifically, the decoder monitors the NNZcounter and compares it with some threshold after receiving each coding unit. In this example, the number of total coding units is not used. Yet, it will be noted that the NNZcounter will be checked against the threshold at the coding unit boundary.

In yet another example embodiment, the control mechanism for usage of adaptive reconstruction levels might be signaled to the decoder. For example, a flag might be inserted to the slice header or a frame header, to indicate which of the following mechanisms is used to control the transmission and usage of adaptive reconstruction levels: 1) the total number of nonzero coefficients; 2) the number of CUs; or 3) a combination of these two methods.

In another embodiment, this single pass procedure is used, but the adjustment of conventional reconstruction levels in operation 514 is omitted. That is, the offsets are not used to adjust reconstruction levels for encoding of the next frame (or other group of coding units).

In yet another embodiment, a two-pass procedure may be used in which the current frame (or other group of coding units) is re-encoded in operation 504 using the adaptive reconstruction levels determined in operation 506. The changes in reconstruction level may result in different rate-distortion decisions, which can change the coding mode and motion vector decisions made during encoding. The offsets are then transmitted with the re-encoded video so that the decoder can reconstruct the video using the same reconstruction levels used in the encoding decisions. It will be appreciated, that the two-pass procedure adds some delay and complexity to the encoding process.

In yet a further embodiment, the frame (or other grouping of coding units) may be iteratively re-encoded until a change in rate-distortion or offset values is less than a threshold amount. A process of this nature was illustrated and described above in connection with FIG. 6.

Figure 9:
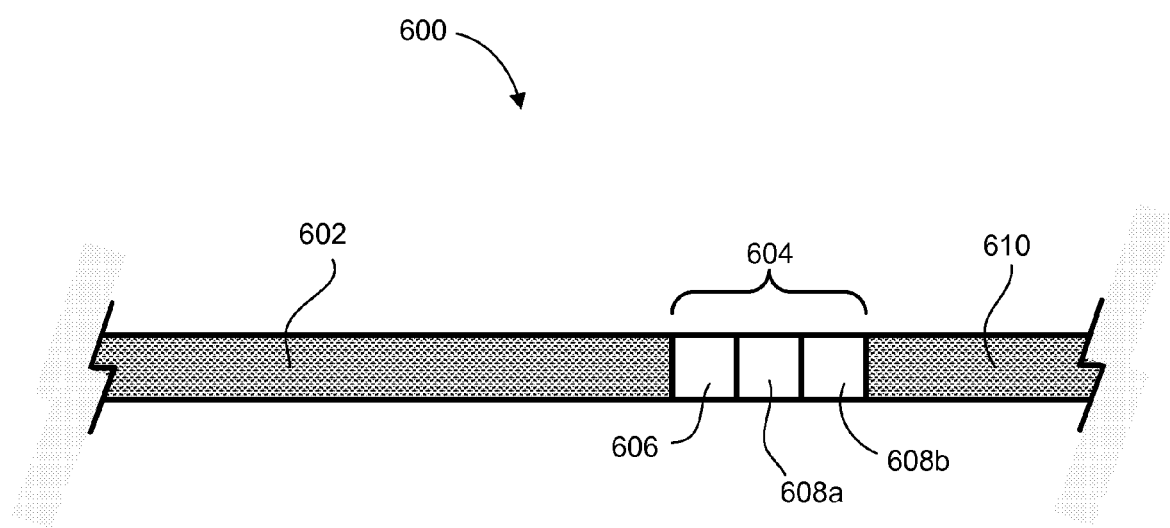
FIG. 9 diagrammatically shows an example bitstream format.

Reference is now may to FIG. 9, which diagrammatically shows an example format of a portion of a bitstream 600. The bitstream contains encoded data 602, which contains, among other things, the entropy encoded indices for a group of coding units, such as a frame, slice, GOP, etc. The bitstream also includes encoded offset data 604. The encoded offset data 604, in this embodiment, includes average offset data 606. The encoded offset data 604 may also include zero or more explicit offsets 608 (shown as 608*a* and 608*b*), depending on whether the number of data points or a rate-distortion analysis justified the sending of an explicit offset for at least one of the sub-parts. In this example, two explicit offsets 608*a* and 608*b* are shown in the bitstream 600. Further encoded data 610 may follow the offset data 604.

The bitstream 600 may be transmitted in digital form using any of a number of protocols. For example, in some cases the bitstream 600 may be streamed or downloaded over a packet-based connection, such as an IP connection, whether wired, wireless, or both. Various communications protocols may be used to facilitate transmission. In some cases, the bitstream 600 may be stored on a processor-readable memory, such as a flash memory, DVD, Blu-Ray™ disc, or any other storage medium, whether optical, magnetic, or other.

Figure 10:
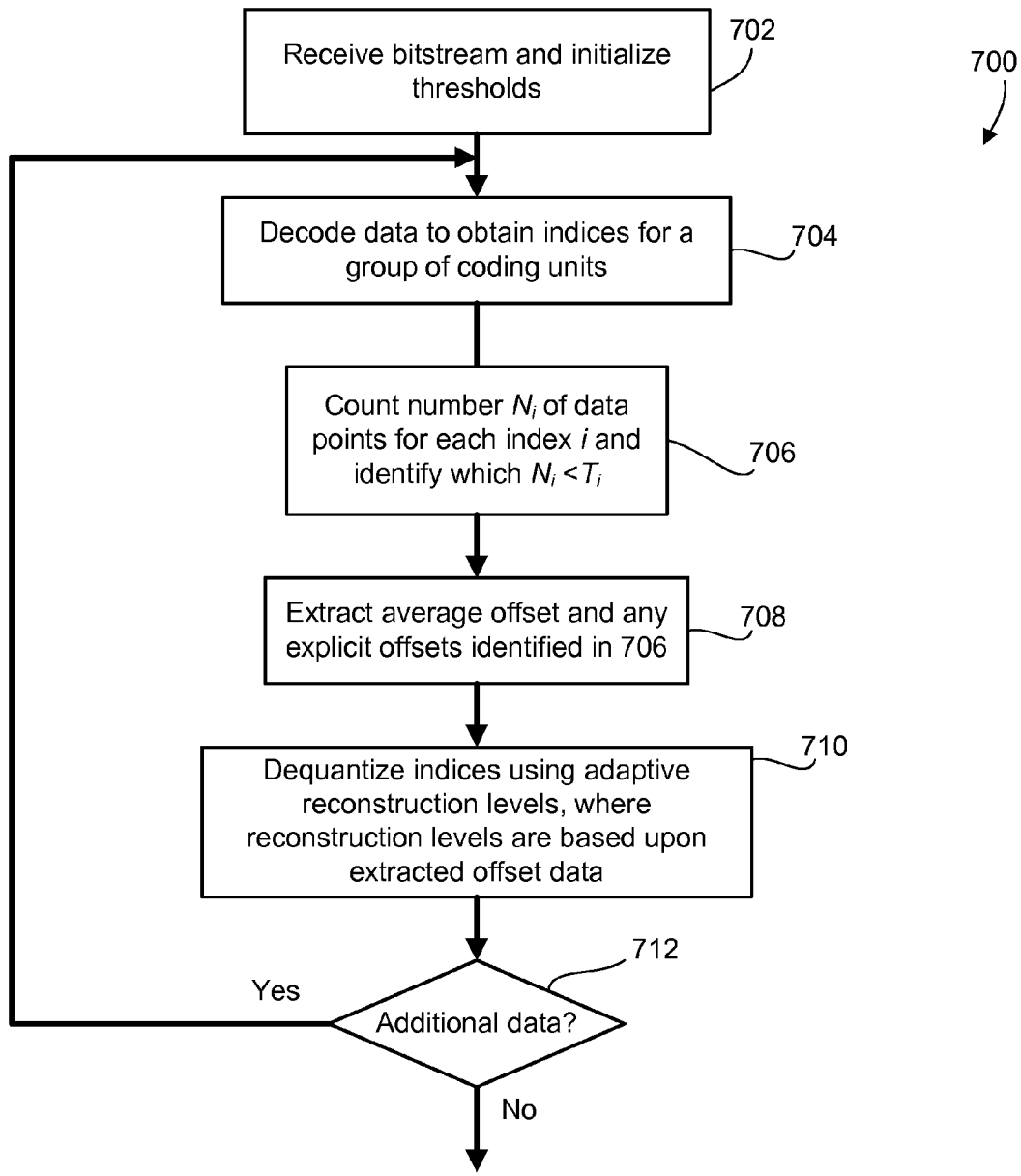
FIG. 10 shows a flow diagram for an example method of decoding encoded compressed data using offset-based adaptive reconstruction levels.

An example method 700 for decoding compressed data is shown in FIG. 10 in flow diagram format.

The method 700 begins with receipt of the bitstream by the decoder in operation 702. The bitstream may be received by reading data from a processor-readable memory or receiving the data from a remote source over a data connection. Operation 702 also indicates initialization of the thresholds $T_i$. The initialized thresholds may be specified in the bitstream or may be default values. In some cases, if the thresholds are default values then they may be overridden or modified by threshold data specified in the bitstream.

In operation 704, the decoder entropy decodes a portion of the bitstream to obtain indices u, i.e. the quantized TCOEFFs, for a group of coding units (a frame, or slice, etc.). The decoder counts the number of each of the indices obtained in operation 704, i.e. the number of data points $N_i$ in each sub-part. The decoder may then determine in operation 706 whether the number of data points $N_i$ for each index/sub-part exceeds its respective threshold $T_i$.

In operation 708, the decoder extracts the average offset value $\bar{d}$ from the bitstream and, based upon the determination made in operation 706, any explicit offset values that are expected to be in the bitstream because $N_i > T_i$ for that index i.

The decoder then, in operation 710, reconstructs the data points, i.e. dequantizes the indices u, using adaptive reconstruction levels, where the adaptive reconstruction levels are based upon the predefined reconstruction levels adjusted using offset data obtained in operation 708. For any indices for which an explicit offset was extracted, the adaptive reconstruction level is determined using that explicit offset. For any other indices, the adaptive reconstruction level is determined using the average offset value $\bar{d}$.

The decoder may repeat operations 704 to 710 provided the bitstream has additional encoded data for a next group of coding units, as indicated by operation 712.

It will be appreciated that the dequantized data resulting from operation 710 is then processed by the decoder in the remainder of the decoding process. For example, the dequantized data is inverse transformed to produce reconstructed residual data, which may then be subjected to motion or spatial compensation processes to generate reconstructed video data.

Observations have shown that the adaptive reconstruction level statistics are related to the quantization parameter (qP) and to the data type. In general, four data types may be identified: InterY, InterUV, IntraY, and IntraUV. The InterY data type refers to Luma residue values from an Inter prediction process. InterUV data type refers to Chroma residue values from an Inter prediction process. Similarly, IntraY data type refers to Luma residue data from an Intra prediction process, and IntraUV data type refers to Chroma residue values from an Intra prediction process.

In view of these observations, offset data for adaptively adjusting reconstruction levels may be specific to a data type and to a portion of the data using a give qP value. For example, in HEVC development it is expected that each frame or slice may have a specific qP value. In some embodiments, a qP value may be specified for a group-of-pictures (GOP). In yet other embodiments, the qP value may be specified for another grouping of blocks of data. Each portion of data, e.g. frame or slice, may have offset values for one or more data types for each reconstruction level being adjusted.

It has also been observed that, although there are a large number of reconstruction levels covering a wide range (in HEVC the levels are specified using 12 bits), the vast majority of data points falls within the first few levels. Accordingly, it is these first few levels that occur most frequently and that are worth adaptively adjusting to reflect empirical statistics of the data. In some embodiments, a parameter may be specified, such as ARL_range, to signal to the decoder how many of the reconstruction levels are to be adapted; i.e., how many levels have associated offset data in the bitstream. In another embodiment, the number of level may be preconfigured or preset for a particular encoder/decoder; for example, through signaling the ARL_range parameter in a header to the video data, or elsewhere in the bitstream.

Figure 13:
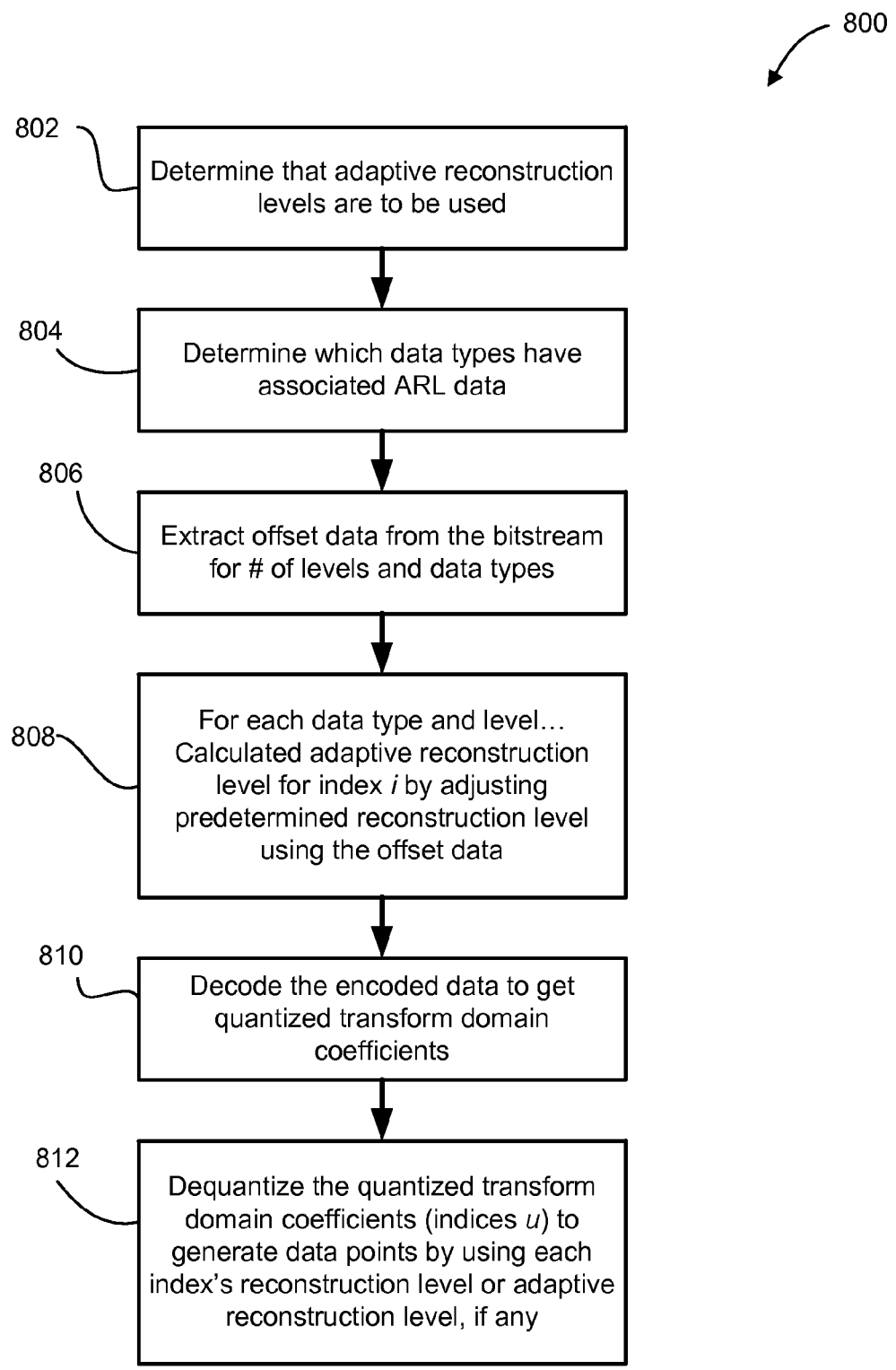
FIG. 13 shows, in flowchart form, an example decoding process using offset-based adaptive reconstruction levels.

Referring now to FIG. 13, an example process 800 for decoding encoded data using adaptive reconstruction levels will be described. The process 800 may be implemented by a decoder. The decoder may, in some implementations, include a decoding application executing on a computing device, such as a video playback machine, a personal computer, a television, a mobile device, a tablet, or any other digital processing device.

The process 800 begins in operation 802 with determining that adaptive reconstruction levels are to be used. As noted above, in some instances adaptive reconstruction levels may be specific to a frame or slice, if each frame or slice has its own qP specified. Accordingly, operation 802 may include checking a flag or other indicator in the frame or slice header to determine whether adaptive reconstruction levels are enabled for this particular frame or slice.

In operation 804, the decoder determines which data types have associated adaptive reconstruction level data. Not every data type will necessarily have offset data in the bitstream. For example, in some instances the encoder may use adaptive reconstruction levels for the Inter Luma residuals for the first four reconstruction levels, but may only use adaptive reconstruction levels for the Inter Chroma residuals for the first two reconstruction levels. Operation 804 may include extracting flags, indicators, or other data from the bitstream that indicates to the decoder for which data types there is offset data in the bitstream for certain levels. Operation 804 may also include determining how many levels have offset data and, if there is offset data for a level, for which data types. In some cases, the levels and data types may be preset or preconfigured; however, in other cases, the levels and/or the data types involved may be signaled in the bitstream.

In operation 806, the decoder extracts offset data from the bitstream. Based on operation 804, it knows whether there is offset data for particular levels and/or data types. Accordingly, it extracts this data in operation 806. In some embodiments, the offset data is absolute offset data. In some cases, it is differential offset data, meaning it is an offset relative to a most recent offset for the same index/data type. In some implementations, the offset data in the bitstream may be an index to an ordered array of offset values, i.e. a pointer to one of the offset values in the array. In one example, the offset values may range from −N to +N, wherein N is a maximum offset value.

Having extracted the offset data, and in some case having determined the offset value from the offset data, the decoder then, in operation 808, calculates the adaptive reconstruction levels for each level and data type involved. In particular, the decoder adjusts a predetermined reconstruction level for that level (index) and data type using the offset data for that level and data type extracted in operation 806. The predetermined reconstruction level may be the unadjusted reconstruction level in some implementations. The predetermined reconstruction level may be the most-recently used (i.e. previously adjusted) adaptive reconstruction level.

The predetermined reconstruction level may be adjusted by adding the extracted offset value to a previously used and stored offset value (in the case of differential offsets). The updated offset value may then be used to adjust the original unadjusted reconstruction level to arrive at the adaptive reconstruction level.

Once the adaptive reconstruction levels have been determined for the various levels and data types, then in operation 810 the decoder entropy decodes the encoded data in the bitstream to obtain indices (quantized transform domain coefficients).

In operation 812, the decoder reconstructs data points by dequantizing the quantized transform domain coefficients. In the case of those coefficients (indices) that have an associated adaptive reconstruction level, the adaptive reconstruction level is used to reconstruct the data point. For example, the data point for an adaptive reconstruction level may be reconstructed by multiplying the adaptive reconstruction level by the quantization step size specified by the q. In some instances, the multiplication may further include scaling, such as is seen in H.264/AVC or HEVC. In some instances this scaling may be part of the inverse transform process, such that the resulting data point is a scaled inverse-transformed dequantized residual value.

This example process 800 is further illustrated by the following syntax example.

The slice header syntax may specify a syntax function: arl_param( ) for implementing adaptive reconstruction levels. An example of this syntax function may be given by:

| arl_param( ) { | Descriptor |
|---|---|
| arl_slice_flag | u(1) |
| If(arl_slice_flag) | |
| { | |
| arl_interY_flag | u(1) |
| if (arl_interY_flag) | |
| { | |
| read_arl_data(ARL_TYPE_INTERY) | |
| arl_interUV_flag | u(1) |
| if (arl_interUV_flag) | |
| { | |
| read_arl_data(ARL_TYPE_INTERUV) | |
| } | u(1) |
| } | |
| arl_intraY_flag | u(1) |
| if(arl_intraY_flag) | |
| { | |
| read_arl_data (ARL_TYPE_INTRAY); | |
| arl_intraUV_flag | u(1) |
| if(arl_intraUV_flag) | |
| { | |

-continued

| arl_param( ) { | Descriptor |
|---|---|
| read_arl_data (ARL_TYPE_INTRAUV) | |
| } | |
| } | |
| } | |
| } | |
| read_arl_data (arl_data_type_id){ | |
| arl_delta_idx[slice_qp][ arl_data_type_id][1] | vlc(v) |
| for(i=2; i<=4;i++){ | |
| arl_delta_i_available | u(1) |
| if (arl_delta_i_available == 1) { | |
| arl_delta_idx[slice_qp][ arl_data_type_id][i] | vlc(v) |
| } | |
| else | |
| break | |
| } | |
| } | |

It will be noted that in this example, it is predetermined that adaptive reconstruction levels are specified for the first level and, possibly, for the second through fourth levels, as indicated by the arl_delta_i_available flag in each case. Note that the value of 4 is an exemplary choice for the parameter of level range, which may take other values. The association between arl_data_type_id and the data type names may, in one example, be:

| arl_data_type_id | Data type |
|---|---|
| 0 | ARL_TYPE_INTRAY |
| 1 | ARL_TYPE_INRAUV |
| 2 | ARL_TYPE_INTERY |
| 3 | ARL_TYPE_INTERUV |

It will be appreciated that other mechanisms for signaling ARL parameters may be used. Indeed, in some cases, the ARL data may be provided as slice training bits and the statistics of the current slice may be used to determine which levels or data types have ARL data present. For example, a number of non-zero coefficients algorithm may be used, such as is described above.

The syntax element arl_delta_idx[qP][DataType][i] specifies the offset for index i for data type DataType with quantization parameter qP. The parameter arl_delta_idx[e][DataType][i] may be a pointer to an offset value in an array. The parameter may be converted to the offset value as follows:

$$ARLoffsetd[qP][DataType][i] = Idx2Delta[arl\_delta\_idx[\ ][DataType][i]]$$

where the array, Idx2Delta is defined, in one example, as:

$$int\ Idx2Delta[16] = \{-15, -13, -11, -9, -7, -5, -3, 0, 1, 3, 5, 7, 9, 11, 13, 15\};$$

The ARLoffsetd, which is a differential offset, is then used to update ARLoffset, the most-recently-used offset value for the same index, qP and DataType to produce an updated offset value:

$$ARLoffset[qP][DataType][i] += ARLoffsetd[qP][DataType][i],\ 1<=i<=4;$$

$$ARLoffset[qP][DataType][i] += ARLoffsetd[qP][DataType][4],\ i>4;$$

It will be appreciated from the foregoing formulas that, in this example implementation, ARLoffsets are individually calculated for each of the first four levels, and the level 4 offset is applied to all levels above four. The updated ARLoffset is then applied to find the reconstruction level for each index:

*ARL[qP][DataType][i]=ARLoffset[qP][DataType][i]+ (i<<7), i>0;*

It will be noted that the index value is left shifted by 7 bits, i.e. multiplied by 128. The value of 7 is an exemplary choice for setting the computation precision and other values may be used. The ARL is later descaled by 128, with the net effect being that the offset value is divided by 128. With a range of −15 to +15, this ensures that the differential change in the offset varies from slice-to-slice by no more than ±15/128 or about 12%.

The ARL value is then used in the dequantization operation. For example, the dequantization operation in one example may be expressed as:

$$d_{ij}=sgn(c_{ij})*(ARL[qP][DataType][abs(c_{ij})]*LevelScale_{(nS)\times(nS)}[qP\%6][i][j])<<(qP/6+trafoPrecisionExt-7), \text{ with } i,j=0\ldots nS-1 \quad (6)$$

The resulting data point $d_{ij}$ is calculated based upon the decoded quantized transform domain coefficient $c_{ij}$ (sometimes also referred to as an "index") multiplied by the updated ARL value and a scaling factor that reflects a non-integer portion of the inverse transformation operation. The dequantization operation reflected in the above Equation (6) further includes a bitshift operation that incorporates both the descaling by 128 (the −7 component), and the dequantization.

It will be understood that the foregoing pseudo-code, expressions and equations provided one example implementation of the present decoding process. The present application is not limited to this particular example implementation.

Through experimental simulations, it has been found that using offset-based adaptive reconstruction levels with hard-decision quantization, under the low-complexity low-delay setting of HEVC codec, outperforms the anchor codec with SDQ by 1% in terms of rate-distortion performance and realizes a computational complexity savings of 10% due to removal of the SDQ procedure. It may be noted that encoding complexity has become a bottleneck in the development of HEVC. The processes and methods described herein provide a desirable quantization design with a good trade-off between rate distortion coding performance and computational complexity.

Figure 11:
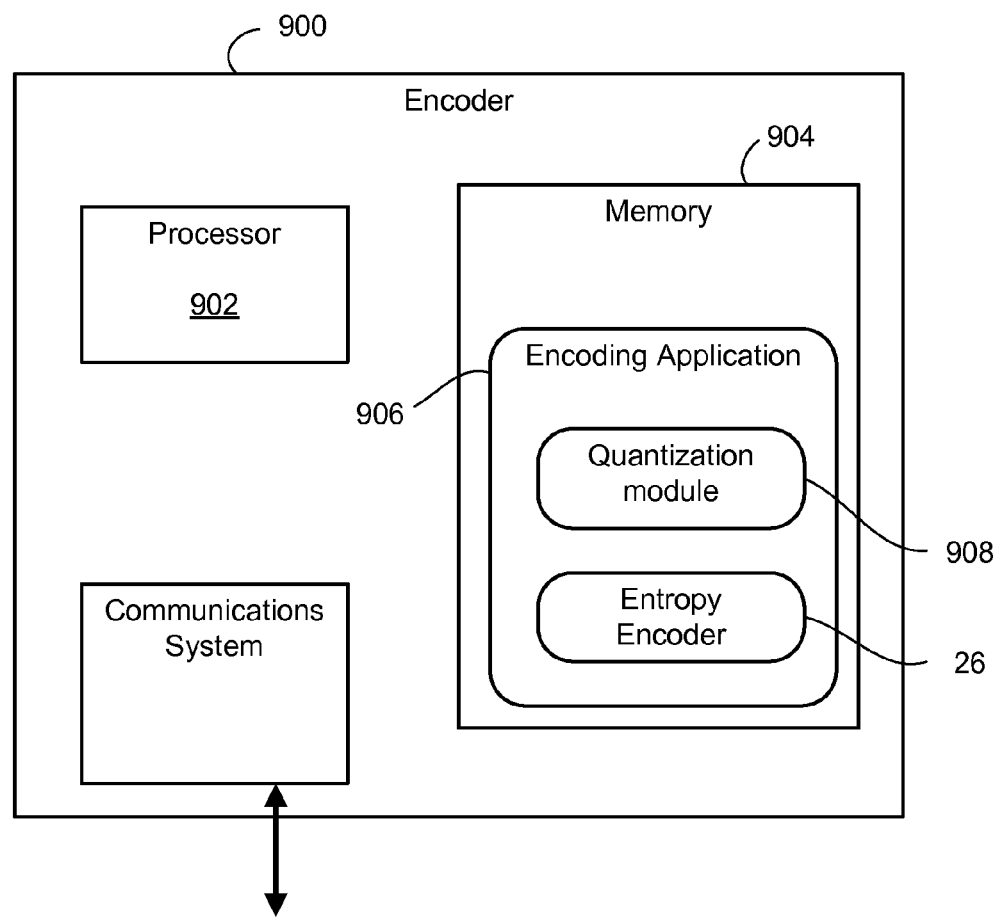
FIG. 11 shows a simplified block diagram of an example embodiment of an encoder.

Reference is now made to FIG. 11, which shows a simplified block diagram of an example embodiment of an encoder 900. The encoder 900 includes a processor 902, memory 904, and an encoding application 906. The encoding application 906 may include a computer program or application stored in memory 904 and containing instructions for configuring the processor 902 to perform steps or operations such as those described herein. For example, the encoding application 906 may encode and output bitstreams encoded in accordance with the adaptive reconstruction level process described herein. The input data points may relate to audio, images, video, or other data that may be subject of a lossy data compression scheme. The encoding application 906 may include a quantization module 908 configured to determine an adaptive reconstruction level for each index of a partition structure. The encoding application 906 may include an entropy encoder 26 configured to entropy encode the adaptive reconstruction levels $q_u$ or offset data, and other data. It will be understood that the encoding application 906 may be stored in on a computer readable medium, such as a compact disc, flash memory device, random access memory, hard drive, etc.

Figure 12:
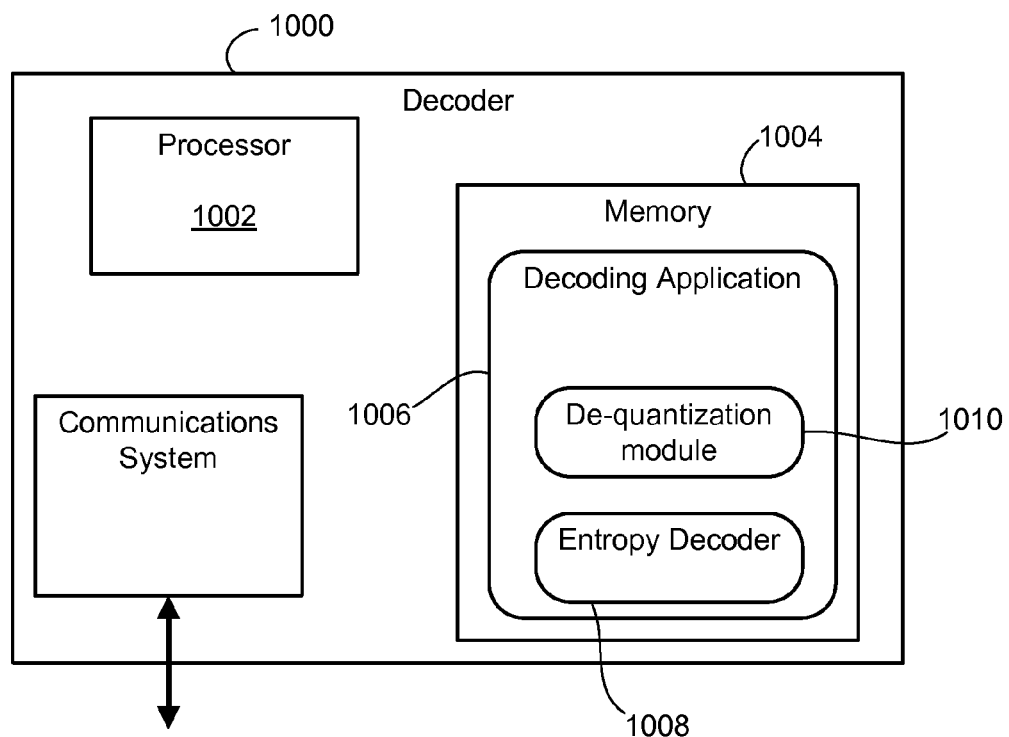
FIG. 12 shows a simplified block diagram of an example embodiment of a decoder.

Reference is now also made to FIG. 12, which shows a simplified block diagram of an example embodiment of a decoder 1000. The decoder 1000 includes a processor 1002, a memory 1004, and a decoding application 1006. The decoding application 1006 may include a computer program or application stored in memory 1004 and containing instructions for configuring the processor 1002 to perform steps or operations such as those described herein. The decoding application 1006 may include an entropy decoder 1008 and a de-quantization module 1010 configured to obtain offset data or adaptive reconstruction levels $q_u$ and use that obtained data to reconstruct transform domain coefficients or other such data points. It will be understood that the decoding application 1006 may be stored in on a computer readable medium, such as a compact disc, flash memory device, random access memory, hard drive, etc.

It will be appreciated that the decoder and/or encoder according to the present application may be implemented in a number of computing devices, including, without limitation, servers, suitably programmed general purpose computers, audio/video encoding and playback devices, set-top television boxes, television broadcast equipment, and mobile devices. The decoder or encoder may be implemented by way of software containing instructions for configuring a processor to carry out the functions described herein. The software instructions may be stored on any suitable computer-readable memory, including CDs, RAM, ROM, Flash memory, etc.

It will be understood that the encoder described herein and the module, routine, process, thread, or other software component implementing the described method/process for configuring the encoder may be realized using standard computer programming techniques and languages. The present application is not limited to particular processors, computer languages, computer programming conventions, data structures, other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A method of decoding a bitstream of compressed data, the method comprising:
   decoding the compressed data to obtain a plurality of quantized transform coefficients;
   extracting offset data from the bitstream, wherein the offset data is associated with a quantization index;
   extracting average offset data from the bitstream, wherein the average offset data is associated with two or more quantization indices;
   calculating a reconstruction level for the quantization index by adjusting a predetermined reconstruction level using the offset data;
   calculating a respective reconstruction level for each of the two or more quantization indices by adjusting respective predefined reconstruction levels using the average offset data; and
   dequantizing each quantized transform coefficient that corresponds to a respective quantization index to generate a data point using that quantization index's respective calculated reconstruction level.

2. The method claimed in claim 1, wherein the predetermined reconstruction level comprises a previously-adjusted reconstruction level for the quantization index, and the respective predetermined reconstruction levels comprise and respective previously-adjusted reconstruction levels for the respective two or more quantization indices.

3. The method claimed in claim 1, wherein the offset data comprises a pointer to an offset value in an array of offset values, and wherein calculating comprises adding the offset value to the quantization index to generate the calculated reconstruction level.

4. The method claimed in claim 1, wherein the offset data comprises a pointer to an offset value in an array of offset values, and wherein calculating comprises adding the offset value to a previously-used offset for the quantization index to generate an updated offset, and adding the updated offset to an unadjusted reconstruction level for the quantization index.

5. The method claimed in claim 1, wherein dequantizing comprises multiplying the calculated reconstruction level by a scaled quantization factor to generate the data point.

6. The method claimed in claim 1, wherein dequantizing further includes reconstructing residues, which includes inverse transforming, and wherein the data point comprises a reconstructed scaled inverse-transformed dequantized residual.

7. The method claimed in claim 1, wherein the plurality of quantized transform coefficients corresponds to a coding unit.

8. A decoder for decoding a bitstream of compressed data, the decoder comprising:
   a processor;
   a memory; and
   a decoding application stored in memory and containing instructions for configuring the processor to decode the compressed data using the method claimed in claim 1.

9. The decoder claimed in claim 8, wherein the predetermined reconstruction level comprises a previously-adjusted reconstruction level for the quantization index, and the respective predetermined reconstruction levels comprise and respective previously-adjusted reconstruction levels for the respective two or more quantization indices.

10. The decoder claimed in claim 8, wherein the offset data comprises a pointer to an offset value in an array of offset values, and wherein the processor is configured to calculate by adding the offset value to the quantization index to generate the calculated reconstruction level.

11. The decoder claimed in claim 8, wherein the offset data comprises a pointer to an offset value in an array of offset values, and wherein the processor is configured to calculate by adding the offset value to a previously-used offset for the quantization index to generate an updated offset, and adding the updated offset to an unadjusted reconstruction level for the quantization index.

12. The decoder claimed in claim 8, wherein the processor is configured to dequantize by multiplying the calculated reconstruction level by a scaled quantization factor to generate the data point.

13. The decoder claimed in claim 8, wherein the processor is further configured to reconstruct residues, which includes inverse transforming, and wherein the data point comprises a reconstructed scaled inverse-transformed dequantized residual.

14. The decoder claimed in claim 8, wherein the plurality of quantized transform coefficients corresponds to a coding unit.

15. A non-transitory processor-readable medium storing processor-executable instructions which, when executed, configures one or more processors to perform the method claimed in claim 1.

16. A method for encoding transform domain coefficients for a group of coding units, wherein the transform domain coefficients are quantized by a quantizer that associates each transform domain coefficient with a quantization index based upon in which sub-part of a partitioned data space that transform domain coefficient is located, the method comprising:
   for each of a plurality of the sub-parts, determining a respective average transform domain coefficient for that sub-part;
   calculating an offset for each sub-part of the plurality of sub-parts by determining a difference between the respective average transform domain coefficient for that sub-part and a predetermined reconstruction level for that sub-part;
   calculating an average offset for at least two of the sub-parts; and
   entropy encoding the quantization indices associated with the transform domain coefficients to output a bitstream of compressed data and inserting into the bitstream
      offset data from which one of the offsets for one of the sub-parts can be calculated and
      average offset data from which the average offset for the at least two of the sub-parts can be calculated.

17. The method claimed in claim 16, wherein the determining, calculated and entropy encoding are applied on a slice-by-slice basis.

18. The method claimed in claim 17, wherein the determining, calculating and entropy encoding are further applied on a data-type basis, and wherein inserting includes inserting flags indicating the data types for which offset data is inserted in the bitstream.

19. The method claimed in claim 18, wherein the data types include Inter Luma data, Inter Chroma data, Intra Luma data, and Intra Chroma data.

20. The method claimed in claim 16, wherein the offset data comprises differential offset data specifying the difference between the calculated offset for said one of the sub-parts and a previously-used offset for said one of the sub-parts.

21. The method claimed in claim 16, wherein the offset data comprises a pointer to a value in a predetermined array of offset values.

22. An encoder for encoding transform domain coefficients for a group of coding units, the encoder comprising:
   a processor;
   a memory storing the data points; and
   an encoding application stored in memory and containing instructions for configuring the processor to encode the transform domain coefficients using the method claimed in claim 16.

23. A non-transitory processor-readable medium storing processor-executable instructions which, when executed, configures one or more processors to perform the method claimed in claim 16.

24. The method claimed in claim 1, wherein the extracting average offset data from the bitstream is performed in response to decoding a stop code indicating that no further individual quantization index offset data is coded in the bitstream.

25. The method claimed in claim 1, further comprising determining a count of quantized transform coefficients, and wherein the extracting average offset data is performed for the two or more quantization indices in response to comparing the count of quantized transform coefficients with a threshold value.

26. The method claimed in claim 25, wherein determining a count includes determining the number of quantized transform coefficients corresponding to one of the two or more quantization indices, and wherein comparing includes determining that the number is less than a threshold value.

27. The method claimed in claim 26, wherein the threshold value is specific to said one of the two or more quantization indices.

* * * * *